(12) United States Patent
Brown et al.

(10) Patent No.: US 10,983,344 B2
(45) Date of Patent: Apr. 20, 2021

(54) SYSTEM FOR OPTICAL WIRELESS COMMUNICATION TO EXTENDED REALITY IMMERSION DEVICE

(71) Applicant: 8 RIVERS CAPITAL, LLC, Durham, NC (US)

(72) Inventors: William J. Brown, Durham, NC (US); Hannah Clark, Durham, NC (US); Miles R. Palmer, Chapel Hill, NC (US); Damian Beauchamp, Hillsborough, NC (US); Jeremy Eron Fetvedt, Raleigh, NC (US)

(73) Assignee: 8 RIVERS CAPITAL, LLC., Durham, NC (US)

( * ) Notice: Subject to any disclaimer, the term of this patent is extended or adjusted under 35 U.S.C. 154(b) by 0 days.

(21) Appl. No.: 16/536,830

(22) Filed: Aug. 9, 2019

(65) Prior Publication Data

US 2020/0049989 A1     Feb. 13, 2020

Related U.S. Application Data

(60) Provisional application No. 62/717,457, filed on Aug. 10, 2018.

(51) Int. Cl.
*G02B 27/01*      (2006.01)
*H04N 13/302*     (2018.01)
(Continued)

(52) U.S. Cl.
CPC ......... *G02B 27/017* (2013.01); *G02B 26/105* (2013.01); *G06F 3/013* (2013.01); *H04N 13/302* (2018.05); *H04N 13/344* (2018.05)

(58) Field of Classification Search
CPC ..... G02B 27/017; G02B 26/105; G06F 3/013; H04N 13/302; H04N 13/344
(Continued)

(56) References Cited

U.S. PATENT DOCUMENTS

| | | | | |
|---|---|---|---|---|
| 5,726,786 A | * | 3/1998 | Heflinger | H04B 10/1149 398/121 |
| 5,781,671 A | * | 7/1998 | Li | H04B 10/803 372/50.1 |

(Continued)

FOREIGN PATENT DOCUMENTS

| | | | | |
|---|---|---|---|---|
| CN | 106487448 A | | 3/2017 | |
| FR | 3045844 A1 | * | 6/2017 | ......... H04Q 11/0067 |

(Continued)

OTHER PUBLICATIONS

Guelman, et al., "Acquisition and Pointing Control for Inter-Satellite Laser Communications", IEEE Transactions on Aerospace and Electronic Systems, vol. 40, No. 4, Oct. 2004, pp. 1239-1248.

(Continued)

*Primary Examiner* — Dalzid E Singh
(74) *Attorney, Agent, or Firm* — Womble Bond Dickinson (US) LLP

(57) ABSTRACT

An optical communication system includes a base station and an extended reality immersion device (XRID). The base station includes an optical transmitter assembly configured to convert an electrical signal to an optical beam, and emit the optical beam in free space, uncollimated and with a divergence angle greater than 0.1 degrees. The XRID includes an optical receiver assembly having an acceptance angle greater than 0.1 degrees. The optical receiver is configured to detect the optical beam in free space, convert the optical beam to a corresponding electrical signal, and reproduce information carried by the corresponding electrical signal. The XRID also includes a head-up display configured to present the information.

25 Claims, 21 Drawing Sheets

(51) Int. Cl.
*H04N 13/344* (2018.01)
*G02B 26/10* (2006.01)
*G06F 3/01* (2006.01)

(58) Field of Classification Search
USPC ........................................................ 398/140
See application file for complete search history.

(56) References Cited

U.S. PATENT DOCUMENTS

| | | | |
|---|---|---|---|
| 6,630,915 B1 * | 10/2003 | Flood ................... | G02B 27/017 345/8 |
| 8,204,378 B1 * | 6/2012 | Marsland, Jr. ....... | H04B 10/613 398/152 |
| 8,514,208 B2 | 8/2013 | Champion et al. | |
| 8,675,911 B2 * | 3/2014 | Barbier ................. | G01S 5/163 348/169 |
| 8,902,076 B2 | 12/2014 | Pederson et al. | |
| 8,948,601 B2 | 2/2015 | Shar et al. | |
| 9,715,834 B2 * | 7/2017 | Jones .................... | F41A 33/00 |
| 9,847,834 B2 | 12/2017 | Palmer et al. | |
| 9,880,619 B2 | 1/2018 | Parham et al. | |
| 2007/0031151 A1 * | 2/2007 | Cunningham ..... | H04B 10/1123 398/131 |
| 2009/0310971 A1 | 12/2009 | Kim et al. | |
| 2010/0209105 A1 | 8/2010 | Shin et al. | |
| 2011/0105134 A1 * | 5/2011 | Kim ..................... | H04W 72/048 455/450 |
| 2013/0250981 A1 * | 9/2013 | Busico ................. | H04B 10/506 372/20 |
| 2014/0153923 A1 * | 6/2014 | Casaccia .............. | H04B 10/116 398/58 |
| 2014/0265920 A1 | 9/2014 | Pederson | |
| 2015/0215040 A1 * | 7/2015 | Dickson ............. | H04B 10/1125 398/131 |
| 2017/0069217 A1 | 3/2017 | Jones et al. | |
| 2018/0059225 A1 * | 3/2018 | Zhu ....................... | G06T 3/4076 |
| 2018/0227052 A1 * | 8/2018 | Kim ..................... | H04B 10/116 |
| 2018/0287701 A1 * | 10/2018 | Afgani ................ | H04W 74/0816 |
| 2019/0068279 A1 * | 2/2019 | Shaw ................... | H04N 5/3415 |
| 2020/0003618 A1 * | 1/2020 | Fujita ....................... | G01J 3/36 |

FOREIGN PATENT DOCUMENTS

| | | |
|---|---|---|
| WO | 97/49204 A1 | 12/1997 |
| WO | 2015/106110 A1 | 7/2015 |
| WO | 2017/108583 A1 | 6/2017 |

OTHER PUBLICATIONS

International Search Report from corresponding International Appl. No. PCT/IB2019/056808, dated Dec. 16, 2019.

* cited by examiner

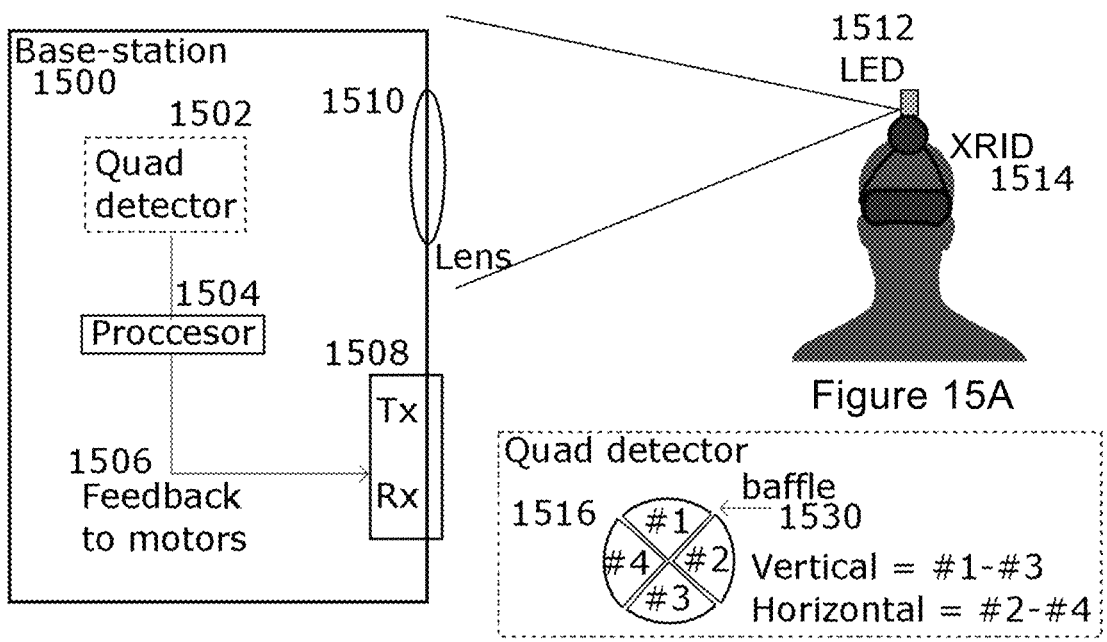
Figure 15A
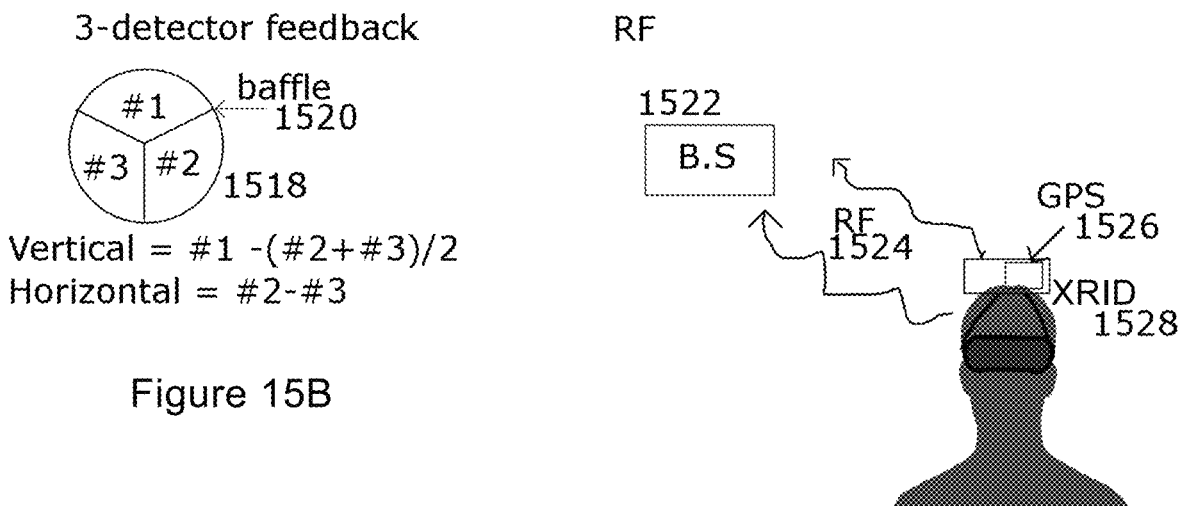
Figure 15B
Figure 15C

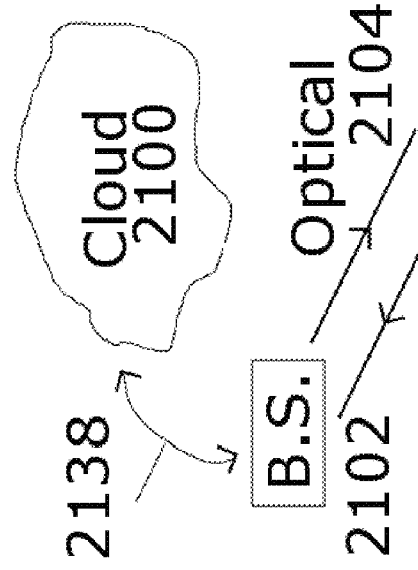
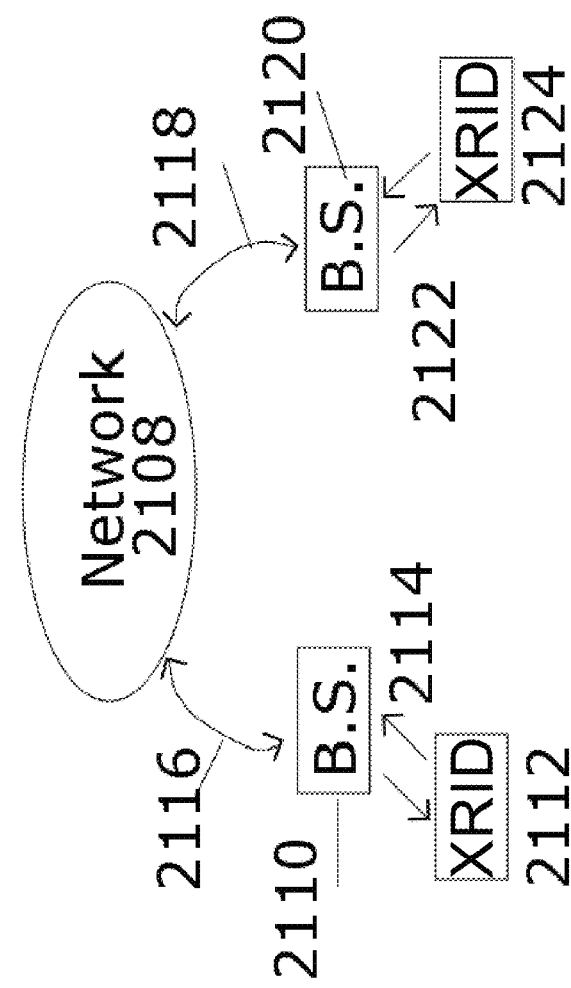
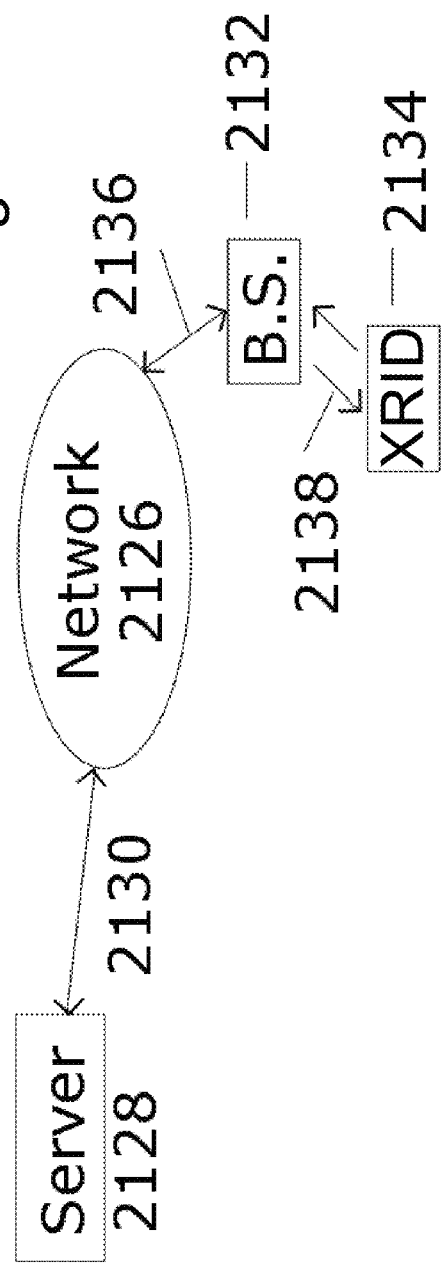

SYSTEM FOR OPTICAL WIRELESS COMMUNICATION TO EXTENDED REALITY IMMERSION DEVICE

CROSS-REFERENCE TO RELATED APPLICATION(S)

The present application claims priority to U.S. Provisional Patent Application No. 62/717,457, entitled: System for Optical Wireless Communication to Headset, filed on Aug. 10, 2018, the content of which is incorporated herein by reference in its entirety.

TECHNOLOGICAL FIELD

The present disclosure relates generally to high-speed free-space optical communication links and, in particular, to using such links to transmit data to and from a user extended reality immersion device.

BACKGROUND

Various designs, methods and implementations, and systems for simulated and/or virtual/augmented/mixed reality environments exist in the literature. The majority of these describe a mobile user that may have an extended reality immersion device (XRID), and immobile base station that does the majority of the processing and a communication system between the two. The prior art includes patents surrounding XRID design, full system design and implementing wireless communications into various parts of the system. Full-design systems include an XRID, a base-station where the major audio/video processing occurs, and communications between the two. Various other patents focus on only the indoor communications pieces and include LiFi (light fidelity), RF (radio frequency) and MMW (millimeter wave) communications protocols. Prior art communications systems have sought to minimize the bandwidth required for such systems in order to make them practical for RF communications, including MMW. RF spectrum bandwidth available for such communications is a major limitation to the prior art. XRID and base station processing to achieve the compression needed to minimize this bandwidth also places major limitations on the prior art by increasing power, weight, and cost. Optical communications is known to solve these problems, but only in a limited way that introduces other limitations on numbers of users, bandwidths, complexity, weight, form factor, and cost.

U.S. Pat. No. 6,630,915 to Flood et al. discloses such a full system including a headset, base station, and wireless communication link between the two. Flood uses active tracking to point the transmitter at the receiver. The preferred embodiment for the transmitter is a laser with current modulator and the preferred embodiment for the tracking system is with tracking sensors on the headset that provide locations to the transmitter which is moved by a two-axis gimbal. Digital information is relayed via amplitude modulation (on-off keying) of the laser. The detector, whose preferred implementation is an APD with gain stage detects the presence or absence of a light pulse and amplifies and digitizes it. FIG. 1 shows one of the main figures from this patent showing an optical transceiver system with a computer and user headset. The user moves about the room and remains connected to the computer via the wireless communications system.

While Flood et al. describe the various pieces needed for simulation system based on wireless communications, they do not teach the various concepts needed to design such a system. These may include the shape, type, or divergence of the optical beam, how tracking mechanisms are implemented and their various options, and how different modulation schemes can be used for different performance metrics. Some of these topics are non-obvious in the context of typical wireless communication design. Furthermore, they briefly mention the option of having multiple users, but make no claims or statements teaching how this would be implemented.

U.S. Pat. No. 8,514,208 to Champion et al. discloses a method and apparatus for optical wireless communication digital video source and a display device. The focus of these teachings is on the protocol and control layer for sending video from a transmitter to a receiver with a shadow memory. While the optical wireless transmission using a laser is the preferred implementation, the patent's disclosures are not on the optical wireless system parameters or design, but on the video data transfer protocols.

U.S. Pat. No. 8,948,601 to Shar et al. discloses a method and system for indoor optical wireless bidirectional communications links between multiple user units and a centralized unit using collimated invisible light and a method for alignment between the users and the central unit using a visible light source on the central unit and windows on the user units to reflect it back. This patent teaches the use of collimated light beams, thus always requiring a tracking mechanism. Furthermore, it also does not teach a complete system for optical wireless including modulation techniques, beam shape or divergence, or receiver art.

Additionally, there are numerous patents surrounding LiFi (light fidelity) technology including U.S. Pat. Pub. No. 2011/0105134, U.S. Pat. Pub. No. 2010/0209105, and U.S. Pat. Pub. No. 2009/0310971 which disclose visible light communication systems and methods using LEDs as the data transmission sources. Others include U.S. Pat. Pub. No. 2014/0265920, and U.S. Pat. No. 8,902,076, which teach the use of LEDs for illuminating interior room and building spaces as well as non-visible modulation of those LEDs for higher rate data communications. These systems are limited to lower data rates due to the upper limit on modulation rate for current LED technology and could not be used for high definitely video transfer or HDMI.

Various other patents address pieces of the full simulation system, which include U.S. Pat. No. 9,880,619 which discloses a finger-wearable VR communication device for tracking and position sensing of the user using wireless optical communication and U.S. Pat. Pub. No. 2017/0069217, which includes a full immersive system including limb and body movements using RF and 60 GHz communication frequencies.

Guelman et al. in IEEE Transactions on Aerospace and Electronic Systems 40(4):1239-1248 (2004) describe an acquisition and pointing control system for laser communications designed for inter satellites. Their device uses steering mirrors (fine and coarse) pointing, as well as a focusing mirror and quadrant detector. Their laser communication system beam's divergence is ~50 microradians, putting it in the class of very fine pointing and tracking mechanisms with highly collimated beams. Additionally, they use a focusing mirror and fiber coupling collection.

Therefore, it would be desirable to have a system and method that takes into account and resolves at least some of the issues discussed above, as well as possibly other issues.

BRIEF SUMMARY

Example implementations of the present disclosure relate generally to high-speed free-space optical communication links and, in particular, to using such links to transmit data to and from a user extended reality immersion device (XRID). As described herein, an XRID includes any of a number of devices designed to enable an extended reality or immersive experience. Examples of suitable XRIDs include headsets, haptic-based wearables, virtual environment control (e.g., humidity, temperature, odor, air circulation), simulator game machines (e.g., virtual vehicles), and the like. The present disclosure therefore includes, without limitation, the following example implementations.

Some example implementations provide an optical communication system comprising a base station including an optical transmitter assembly configured to convert an electrical signal to an optical beam, and emit the optical beam in free space, uncollimated and with a divergence angle greater than 0.1 degrees; and an extended reality immersion device (XRID) including: an optical receiver assembly having an acceptance angle greater than 0.1 degrees, the optical receiver configured to detect the optical beam in free space, convert the optical beam to a corresponding electrical signal, and reproduce information carried by the corresponding electrical signal; and a head-up display configured to present the information.

In some example implementations of the optical communication system of any preceding example implementation, or any combination of any preceding example implementations, the optical communication system comprises a plurality of XRIDs including the XRID, and the optical receiver assembly is configured to detect the optical beam on a communication channel having a particular wavelength assigned to the XRID in the optical communication system, the particular wavelength differing from other particular wavelengths assigned to others of the plurality of XRIDs.

In some example implementations of the optical communication system of any preceding example implementation, or any combination of any preceding example implementations, the optical communication system comprises a plurality of XRIDs including the XRID, and the optical beam is time-division multiplexed to serve the plurality of XRIDs.

In some example implementations of the optical communication system of any preceding example implementation, or any combination of any preceding example implementations, the optical communication system comprises a plurality of base stations including the base station, and a plurality of XRIDs including the XRID, the plurality of base stations assigned to respective ones of the plurality of XRIDs, wherein the optical receiver assembly is configured to detect the optical beam on a communication channel between the XRID and the base station that is assigned to the XRID.

In some example implementations of the optical communication system of any preceding example implementation, or any combination of any preceding example implementations, the optical receiver assembly is configured to detect the optical beam on a communication channel between the XRID and the base station, and wherein the optical communication system further comprises another XRID, and the XRID further comprises an optical transmitter assembly configured to encode an electrical signal with the information, convert the electrical signal to a corresponding optical beam, and emit the corresponding optical beam in free space on another communication channel between the XRID and the other XRID, the XRID thereby configured to relay the information from the base station to the other XRID.

In some example implementations of the optical communication system of any preceding example implementation, or any combination of any preceding example implementations, the base station includes a pointing system configured to point the optical transmitter assembly in a direction of the XRID.

In some example implementations of the optical communication system of any preceding example implementation, or any combination of any preceding example implementations, the base station further includes a tracking system configured to track the XRID as the XRID moves, the pointing system configured to point the optical transmitter assembly in the direction of the XRID as tracked.

In some example implementations of the optical communication system of any preceding example implementation, or any combination of any preceding example implementations, the XRID includes a pointing system configured to point the optical receiver assembly in a direction of the base station.

In some example implementations of the optical communication system of any preceding example implementation, or any combination of any preceding example implementations, the XRID further includes a tracking system configured to track the base station as the XRID moves, the pointing system configured to point the optical receiver assembly in the direction of the base station as tracked.

In some example implementations of the optical communication system of any preceding example implementation, or any combination of any preceding example implementations, the information is carried by the electrical signal, and thereby also carried by the optical beam from the base station to the XRID, and wherein the base station is configured to track a location and orientation of the XRID, and generate or modify the information carried by the optical beam based on the location and the orientation of the XRID.

Some example implementations provide an extended reality immersion device (XRID) comprising an optical receiver assembly having an acceptance angle greater than 0.1 degrees, the optical receiver configured to detect an optical beam in free space, convert the optical beam to a corresponding electrical signal, and reproduce information carried by the corresponding electrical signal; and a head-up display configured to present the information.

In some example implementations of the XRID of any preceding example implementation, or any combination of any preceding example implementations, the optical receiver assembly includes at least one array of optical detectors arranged to provide up to 2 pi steradians of coverage.

In some example implementations of the XRID of any preceding example implementation, or any combination of any preceding example implementations, the optical receiver assembly includes at least one array of coplanar optical detectors.

In some example implementations of the XRID of any preceding example implementation, or any combination of any preceding example implementations, the optical receiver assembly includes a longpass filter and an optical detector, the longpass filter configured to suppress at least some visible and ultraviolet light from the optical beam, and the optical detector configured to detect the optical beam as filtered.

In some example implementations of the XRID of any preceding example implementation, or any combination of any preceding example implementations, the optical receiver assembly further includes a bandpass filter between the longpass filter and the optical detector, the bandpass filter configured to further filter the optical beam.

In some example implementations of the XRID of any preceding example implementation, or any combination of any preceding example implementations, the XRID further comprises an optical transmitter assembly configured to convert an electrical signal to a corresponding optical beam, and emit the corresponding optical beam in free space, uncollimated and with a divergence angle greater than 0.1 degrees.

In some example implementations of the XRID of any preceding example implementation, or any combination of any preceding example implementations, the optical transmitter assembly includes a laser and a longpass filter, the laser configured to emit the corresponding optical beam, and the longpass filter configured to suppress at least some visible and ultraviolet light from the corresponding optical beam.

In some example implementations of the XRID of any preceding example implementation, or any combination of any preceding example implementations, the optical receiver assembly and the optical transmitter assembly are combined in an arrangement further including a dichroic configured to pass the corresponding optical beam from which the longpass filter is configured to suppress at least some of the visible and ultraviolet light, and wherein the optical receiver assembly includes an optical detector, the longpass filter configured to suppress at least some visible and ultraviolet light from the optical beam, the dichroic configured to reflect the optical beam as filtered to the optical detector, and the optical detector configured to detect the optical beam reflected by the dichroic.

In some example implementations of the XRID of any preceding example implementation, or any combination of any preceding example implementations, the optical transmitter assembly includes at least one array of lasers arranged to provide at least 2 pi steradians of coverage.

In some example implementations of the XRID of any preceding example implementation, or any combination of any preceding example implementations, the optical transmitter assembly includes at least one array of coplanar lasers.

In some example implementations of the XRID of any preceding example implementation, or any combination of any preceding example implementations, the optical transmitter assembly includes a plurality of modulators configured to modulate the electrical signal with information thereby carried by the electrical signal, the plurality of modulators configured to share a total current In some example implementations of the XRID of any preceding example implementation, or any combination of any preceding example implementations, the optical transmitter assembly includes a diffuser configured to diffuse the corresponding optical beam.

In some example implementations of the XRID of any preceding example implementation, or any combination of any preceding example implementations, the optical receiver assembly is configured to detect the optical beam on a downlink communication channel having a particular wavelength, and the optical transmitter assembly is configured to emit the corresponding optical beam on an uplink communication channel having another, different particular wavelength.

In some example implementations of the XRID of any preceding example implementation, or any combination of any preceding example implementations, the corresponding electrical signal is encoded with the information using pulse amplitude modulation (PAM) or pulse position modulation (PPM), and the optical receiver assembly is configured to reproduce the information using the PAM or PPM.

In some example implementations of the XRID of any preceding example implementation, or any combination of any preceding example implementations, the optical receiver assembly is configured to detect the optical beam on a downlink communication channel having a particular wavelength, and wherein the XRID further comprises a radio transmitter assembly configured to convert an electrical signal to a corresponding radio signal, and transmit the corresponding radio signal on an uplink communication channel.

These and other features, aspects and advantages of the present disclosure will be apparent from a reading of the following detailed description together with the accompanying figures, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying figures which illustrate, by way of example, the principles of the described implementations.

BRIEF DESCRIPTION OF THE FIGURE(S)

Having thus described the disclosure in the foregoing general terms, reference will now be made to the accompanying figures, which are not necessarily drawn to scale, and wherein:

FIGS. 12A, 12B and 12C illustrate how pointing may be implemented according to various examples;

FIGS. 15A, 15B and 15C illustrate how tracking may be implemented according to various examples;

FIGS. 21A, 21B and 21C illustrate examples in which one or more base stations are connected to a network or cloud, according to various example implementations.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, for example, the singular forms "a," "an," "the" and the like include plural referents unless the context clearly dictates otherwise. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

To insure consistent nomenclature, the following terms are used herein: node, link, and channel. A node is a physical location within the network and may be stationary or mobile. A link is a diverged beam free space optical (DBFSO) connection between two or more nodes that transmits and receives data and network control information between the nodes. A channel is a single path within a link and is differentiated from other channels by some physical characteristic such as wavelength or polarization and undergoes an electrical to optical (E-O) and optical to electrical (O-E) conversion. A DBFSO system such as that disclosed by U.S. Pat. No. 9,847,834 is made up of many nodes, with each node having one or more links to other nodes. Each link is then made up of one or more channels.

AR/VR DBFSO Links

DBFSO links have been described in detail in the U.S. Pat. No. 9,847,834, the content of which is incorporated by reference in its entirety. Instead of using highly-collimated laser beams with sophisticated pointing and tracking, the approach described in the '834 patent uses higher-power, diverged laser beams to increase the coverage area and angular tolerance, and decrease overall complexity and cost. Likewise, the receiver uses a larger-area detector or detector array to receive light from a range of angles. This architecture results in a lower-cost, higher-performance system compared to previous free space optical (FSO) communications implementations.

Figure 1:
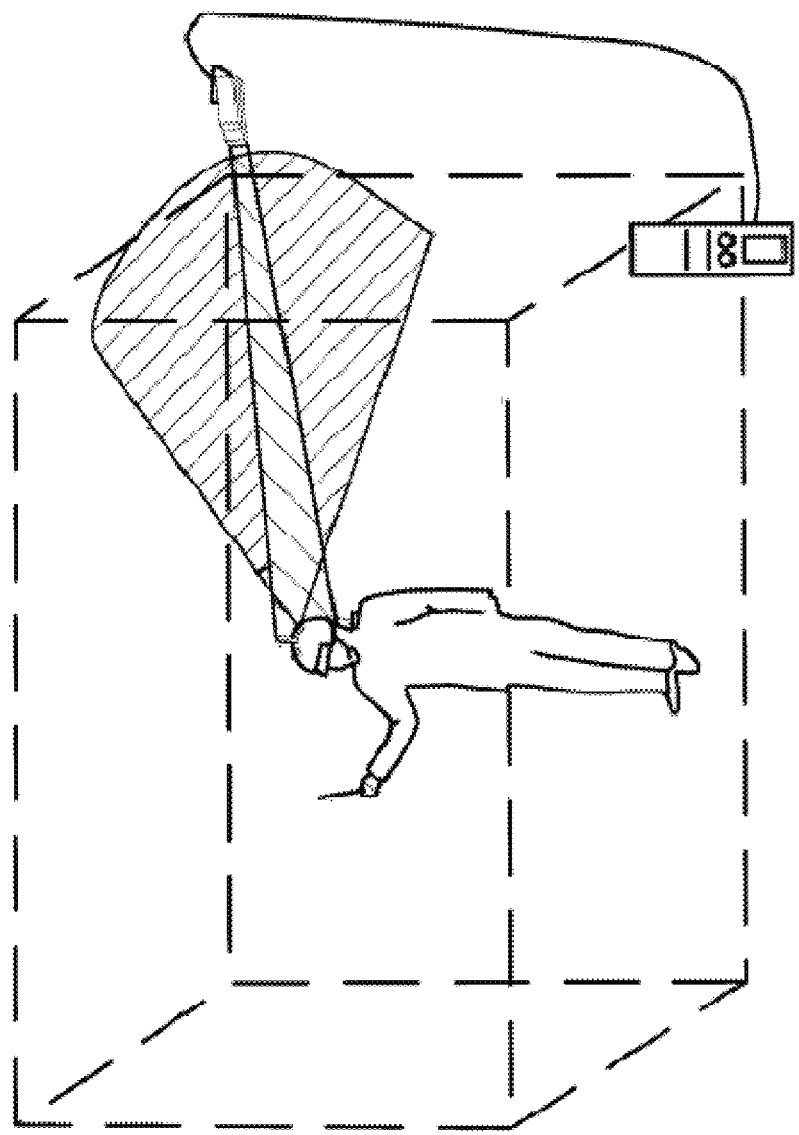
FIG. 1 illustrates an optical transceiver system according to the prior art.
Figure 2:
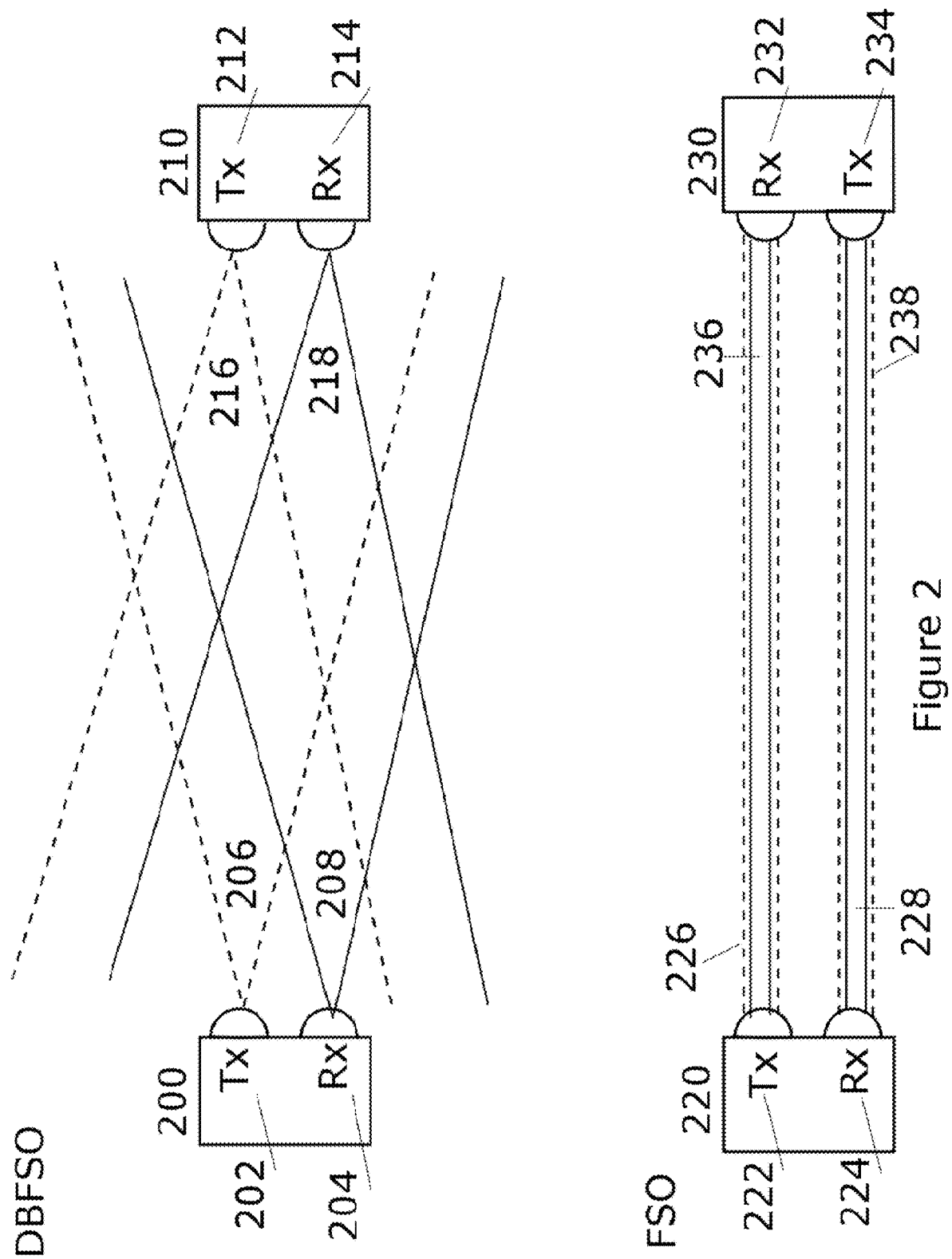
FIG. 2 illustrates a diverged beam free space optical (DBFSO) system according to various example implementations of the present disclosure, and a traditional free space optical (FSO) system.

FIG. 2 illustrates the key differences between the DBFSO system and traditional FSO systems. In a DBFSO system the two nodes 200, 210 each have a transmitter (TX) 202, 212 and a receiver (RX) 204, 214. The transmitters for each node 200, 202 emit diverging optical beams 206, 216 that cover a wide area at the opposite node's receiver. Similarly, each receiver 204, 214 has a broad field-of-view 208, 218, meaning that the receivers are collecting light from a wide range of angles.

In traditional FSO systems, the nodes, 220, 230 also have transmitters 222, 234 and receivers 224, 232, but in these systems the transmit beams are collimated 226, 238 and the receivers have a very narrow field-of-view 236, 228 and collect light that is nearly collimated. This adds cost and complexity to the pointing-and-tracking system for traditional FSO systems. As described in the '834 patent, in some examples, a DBFSO system is described by the transmitter transmitting beams in free space, uncollimated and with a divergence angle greater than 0.1 degrees (and up to 180 degrees), and the receiver having an acceptance angle greater than 0.1 degrees (and up to +/−90 degrees).

This application describes the innovations required to use DBFSO links for high bandwidth, low latency communications to and from user extended reality immersion devices (XRIDs). These headsets may be used for extended reality (XR) such as virtual reality (VR), augmented reality (AR), mixed realty (MR), immersive or other applications requiring high bandwidth communications. Again, examples of suitable XRIDs include headsets, haptic-based wearables, virtual environment control (e.g., humidity, temperature, odor, air circulation), simulator game machines (e.g., virtual vehicles), and the like.

Data transfer for XR applications typically includes high-speed, high-definition video, as well as control commands and feedback from various sensors. The challenge for any wireless system is transmitting the large amount of data required for high-resolution video with minimal latency and maximal data throughput. Typical 4 k video standards include DCI 4K and its relative 4K-UHD, both of which use more than 17 Gbps of uncompressed bandwidth. In order to handle this data transfer rate, wireless solutions may need to use compression algorithms. There are three trade-offs with using compression: first, that compression and decompression algorithms often add latency, second that compression degrades the quality of the picture and third, compression requires an increase in processing power. To ensure the highest quality for data transfer of video, the bandwidth of the communications system must be high while the latency is minimized. There may be additional communications data needed for eye tracking, position tracking, audio, haptic feedback or the like that may use a lower bandwidth channel or the same channel as the high-speed video. High bandwidth optical wireless aims at solving these issues due to its nearly unlimited spectral availability which may solve both the bandwidth and the latency issue, as standard error correction without need for compression results in ultra-low latency requirements.

The bandwidth range for DBFSO for XR applications may range from a 1 Mbps up to and beyond 100 Tbps. DBFSO links with bandwidths of 100 Mbps and 1 Gbps have been reduced to practice. Lower capacity links, down to 1 Mbps can be implemented with a similar architecture as the 100 Mbps link with potentially cheaper components and higher laser power. Current fiber optic communications systems already have single wavelengths carrying 10, 20, 40 and 100 Gbps. These components used in the DBFSO configurations can provide 10 to 100 Gbps links today. Advances in components and the use of multiple wavelengths may extend the link capacity for DBSO to XRIDs up to 100 Tbps.

The physical scenarios for XR type applications have some important differences compared to outdoor FSO communication links for last mile type applications described in some of the prior art. Specifically, most XR is indoor which reduces the amount of ambient light. Since the XR links are usually on the order of meters to tens of meters in length, atmospheric effects are also minimized. However, in XR applications, the XRID will move and rotate and the link must still provide near continuous communications.

Figure 3:
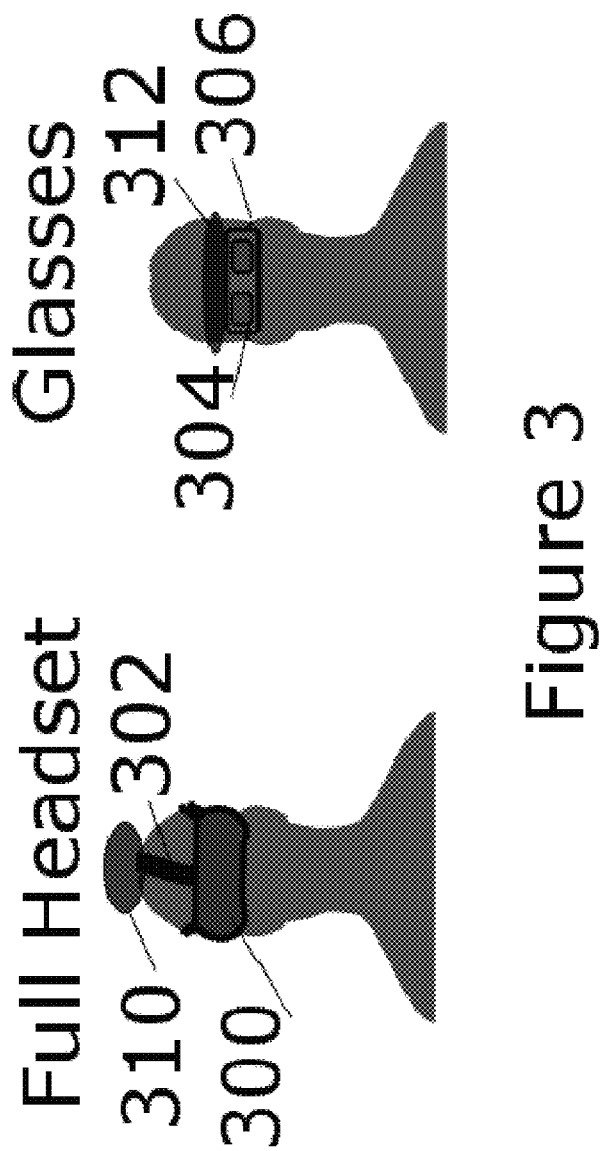
FIG. 3 illustrates possible types of extended reality immersion devices (XRIDs) according to various example implementations.

In most XR applications, the user wears some type of XRID that has a mechanism for projecting an image that is ultimately received by one or both eyes. FIG. 3 shows examples of possible types of XRIDs that can range from full coverage of the head with a portion that covers the eyes completely 300 with straps fitted around the head 302 to implementations that look like glasses 304 with tiny projectors added that rest on the ear pieces 306 or elsewhere in the frame. For the full XRID, the transceiver unit 310 could hook into the head straps 302. For an implementation that has glass 304, the transceiver 312 could integrate or sit near the glasses 304 or be integrated with the rims. Example implementations of the present disclosure can be used with any XRID implementation. For full XRIDs that cover the head, the sensors, transmitters, and receivers can be integrated into the physical structure of the XRID. For the lower profile devices such as glasses, as detectors and electronics are improved, it will be possible to integrate optical links into the frames of glasses.

Receiver Field-of-View

To increase the usability of AR/VR links, communications links need to be maintained while the user moves around. The space in which the user moves may include the entire horizontal plane within some space, as well as vertical (as a user stands, sits on something or lies on the floor), and rotational (as the user spins around in one spot). Complete 4 pi spherical coverage would be the ideal although many use cases will be satisfied by 2 pi or hemispherical coverage. Example implementations of the present disclosure will satisfy in any case, although the exact implementation may be different for individual cases.

As a first example, consider hemispherical coverage of an XRID with the user moving around a room that is 10 meters wide by 10 meters deep by 5 meters tall. If a single base station is used to cover the entire room then it must operate over a distance to the XRID ranging from 3 meters (2 meter tall person directly under transmitter) to $5*sqrt(3)=8.7$ meters (person on floor in corner of room). If the required receive power is 1 microW on a 1 cm^2 detector, then the base-station transmitter must launch at least 4.7 W of power (1 cm^2 out of hemisphere with radius of 8.7 meters).

Many of the previously described example implementations of the DBFSO communications links as well as the standard FSO links have described large detectors with an optics facing out. Many detectors have a larger acceptance angle than needed for the link, and by placing a focusing optic before the detector, the angular range is traded for an increase in optical gain. This reduces the total amount of power needed in the system, while simultaneously decreasing the field of view of the receiver system.

For XR application that requires a broader field-of-view, the acceptance angle of the link will typically be larger than the acceptance angle of a given detector, so multiple detectors pointing in different directions may be needed to achieve the necessary angular coverage. For example, many detectors have an acceptance angle of ~+/−45 degrees. To achieve hemispherical coverage one would need 8 of these detectors (with some overlap between detectors) with one pointing straight up and the other four in the horizontal plane separated by 90 degrees. The cross section over which light can be detected would now be the size of an individual detector. Since there are no optics, the detection area of the receiver is much smaller, so many more detectors are now needed.

Figure 4:
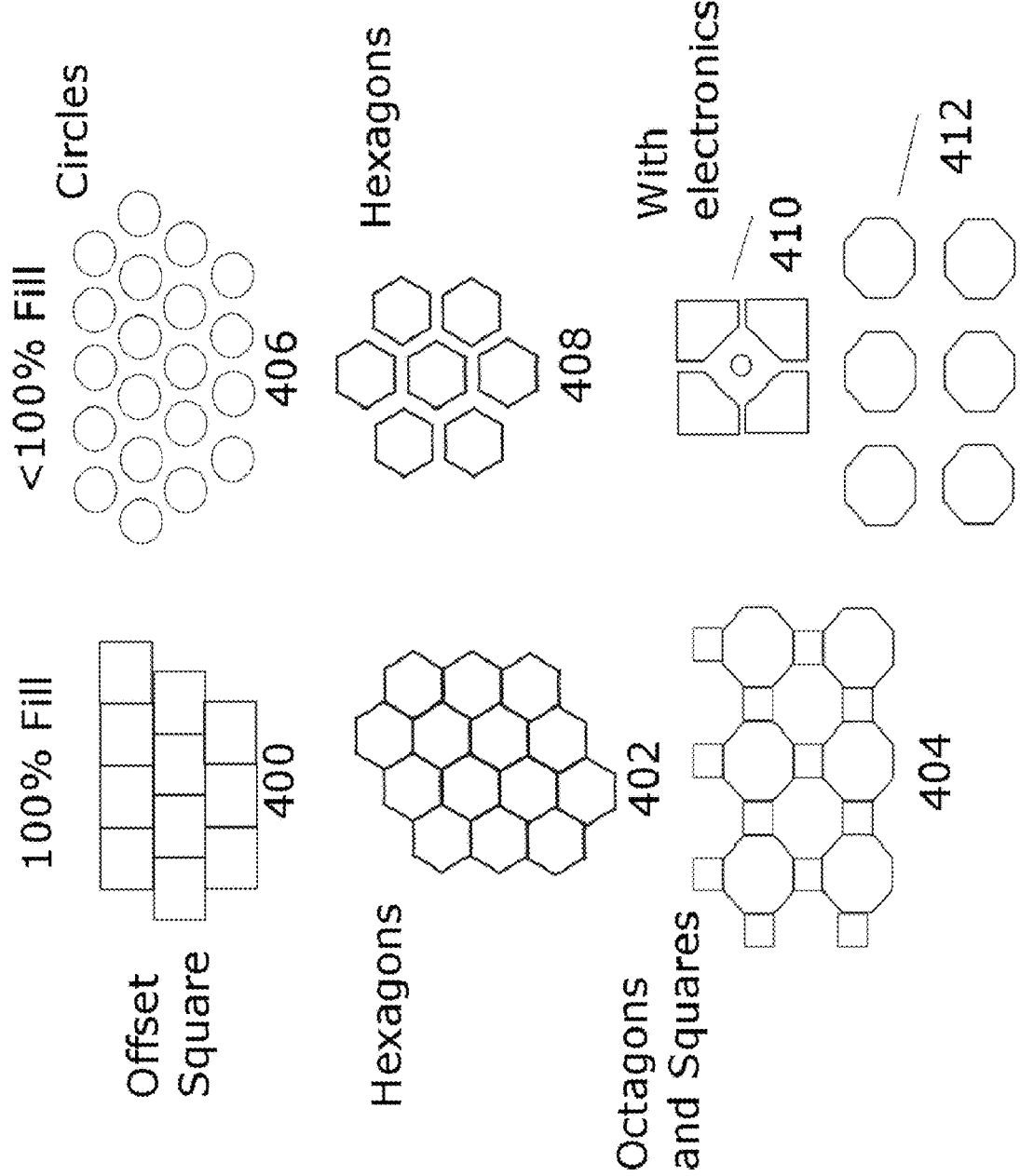
FIG. 4 illustrates a variety of potential arrangements for detector arrays, according to various example implementations.

One example implementation to achieve larger detector size is to use arrays of detectors. In one such implementation, there may be multiple detectors in a single plane that are adjacent or nearly adjacent to each other. FIG. 4 shows a variety of potential arrangements for detector arrays. Fill factors for the arrays can either be 100% which include 400, 402, and 404 where each element is touching all the surrounding elements, or they can have less than 100% fill factor shown in 406, 408, and 410 where there is dead space in between the individual elements. The arrays of detectors could have different geometries such as offset squares 400, where the individual elements are squares and they are arranged in lines with each subsequent line offset from the one above. Other geometries include honeycomb 402, 408 made up of hexagonal elements, with either 100% fill factor 402 or less than 100% fill factor 408, circular elements, 406, octagonal elements 412, octagonal and square combinations, 404 or any combination thereof. Additionally, arrays can also include space for associated electronics 410. There may be multiple sets of these detector arrays in different locations and pointing in different directions. In another case, the detectors may not be coplanar, but point in different directions while still being physically close to each other. Total receiver area for the detectors may be a relevant factor, and this can be achieved in a variety of ways. In some example implementations, the detector arrays may be made out of a single piece of silicon or InGaAs (indium gallium arsenide) and further etched into arrays, while in other cases, discrete detectors may simply be placed adjacent to each other in their separate packages.

In some example implementations, the detectors or detector arrays can be made from avalanche photodiodes (APDs).

In some example implementations, the APDs can be based on silicon materials. These materials may be sensitive to light with wavelengths between 350 nm and 1000 nm. In some example implementations, the APDs can be based on InGaAs materials (indium gallium arsenide). These materials may be sensitive to light with wavelengths from about 1.0 microns up to about 2.6 microns.

In some example implementations, the detectors or detector arrays can be made from SiPMs (silicon photomultipliers) technology.

Filtering/Optical Bandwidth/Angular Acceptance

In some example implementations, the detectors or detector arrays may have optical filters in front of them. These filters may suppress unwanted light from other sources such as room lights, sunlight, or other optical links. In some cases, the filters may be long pass, such as for suppressing most visible and UV light. In some cases, the filters may be bandpass, such as for suppressing visible light and attenuating nearby optical channels. Filters may need to have an angular acceptance range that is similar to the acceptance angle of the detector. For typical thin film interference filters, such as most common bandpass filters, the range of wavelengths accepted changes as a function of angle between the filter and the incoming light. For these filters, the bandpass wavelengths shift to the blue as the angle from the normal increases. This angle tuning effect may limit how spectrally close the next AR/VR communications channel can be to keep the crosstalk below the acceptable level.

Figure 5:
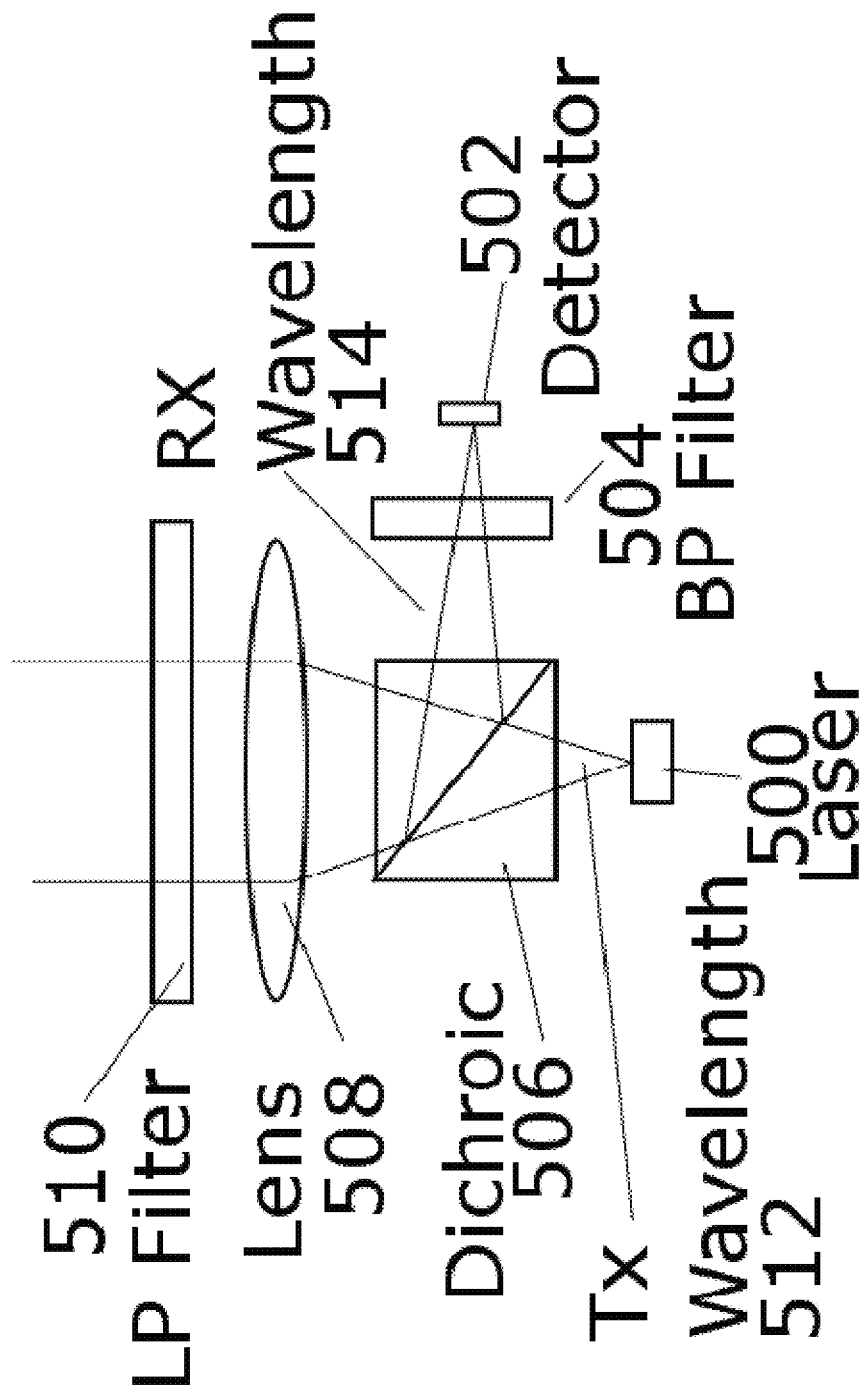
FIG. 5 illustrates a combined transmit and receive system using filters, according to various example implementations.

One possible implementation of a combined transmit and receive system using filters is shown in FIG. 5. Here, the laser 500, and the detector 502 optical paths share a common path until the dichroic 506. For this system, the laser wavelength 512 is different from the bandpass filter wavelength 514, for its own receiver. The transmit light emitted by the laser 500 travels straight through the dichroic 506, through the lens 508, and out through the longpass filter 510 to another node (not shown). Transmitted light from another node follows a similar path back through the longpass filter 510, focusing lens 508 and is reflected into the other arm of the dichroic 506. This light is filtered by a narrowed bandpass filter 504 and finally lands on the receiver 502. Using common elements and a common path reduces the complexity and the overall footprint of the transmit/receive pair. Minimization of cross-talk from the dichroic is one potential issue, although with high out of band blocking on the bandpass filter 504, this should not be an issue. Other possible implementations include using a power beam splitter in place of dichroic 506, removing LP filter 510, removing BP filter 504, or some combination thereof. In addition to optical filtering, known signal processing techniques such as CDMA, TDMA, FDMA, and PDMA can be used to improve signal to noise ratios in high noise environments such as full sunlight.

Laser Arrays

Figure 6:
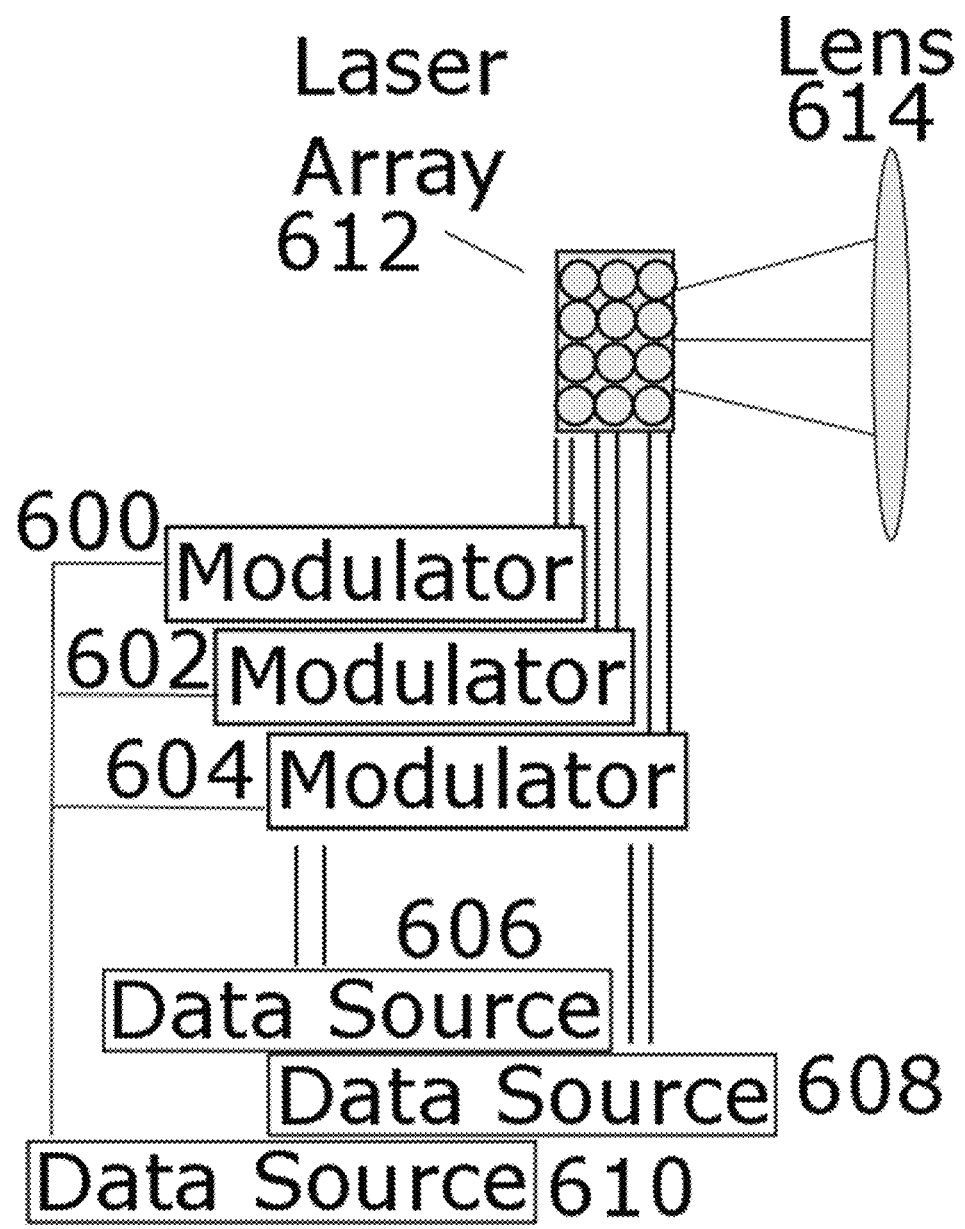
FIG. 6 illustrates an array of VCSEL (vertical cavity, surface emitting laser) elements, according to various example implementations.

In a similar fashion to the receiver, the transmitter may benefit from arrays of lasers. Several of the DBFSO links built to date have used arrays of VCSEL (vertical cavity, surface emitting laser) to achieve high power output and high data rate. These VCSEL arrays can have a few to a few thousand individual VCSEL elements. Such an array is shown in FIG. 6. Here, the laser array 612 is driven by one or more modulators 600, 602, 604. The modulators 600, 602, 604 are each electrically connected to the VCSEL array and any number of them can be used to drive the laser array. At gigahertz speeds, there are currently no known modulators that can drive multiple amps of current needed to produce the several watts of modulated optical power. One solution to this is to use multiple modulators, 600, 602, 604 and share the total current between them. Each modulator can be driven by a separate data source 606, 608, 610, or they can all be driven by the same data source, or any combination of data sources. The emitted modulated light is then diverged by a lens 614.

Eye Safety

In general, the system will be eye safe outside of the transmitter enclosures. In some example implementations, this will be accomplished by using a diffuser which can increase the angular aperture and range of the transmitted beam. This increases the allowed optical power level as the beam is no longer focused to a tight spot on the retina. In some example implementations, such as those using arrays of lasers, the size of the array contributes to making the source eye-safe, as arrays make the source extended which cannot be focused to a tight spot by the retina. In some example implementations, the high divergence of the laser will ensure the beam is eye-safe in a very short distance from the source, making the enclosure needed, very small.

Figure 7:
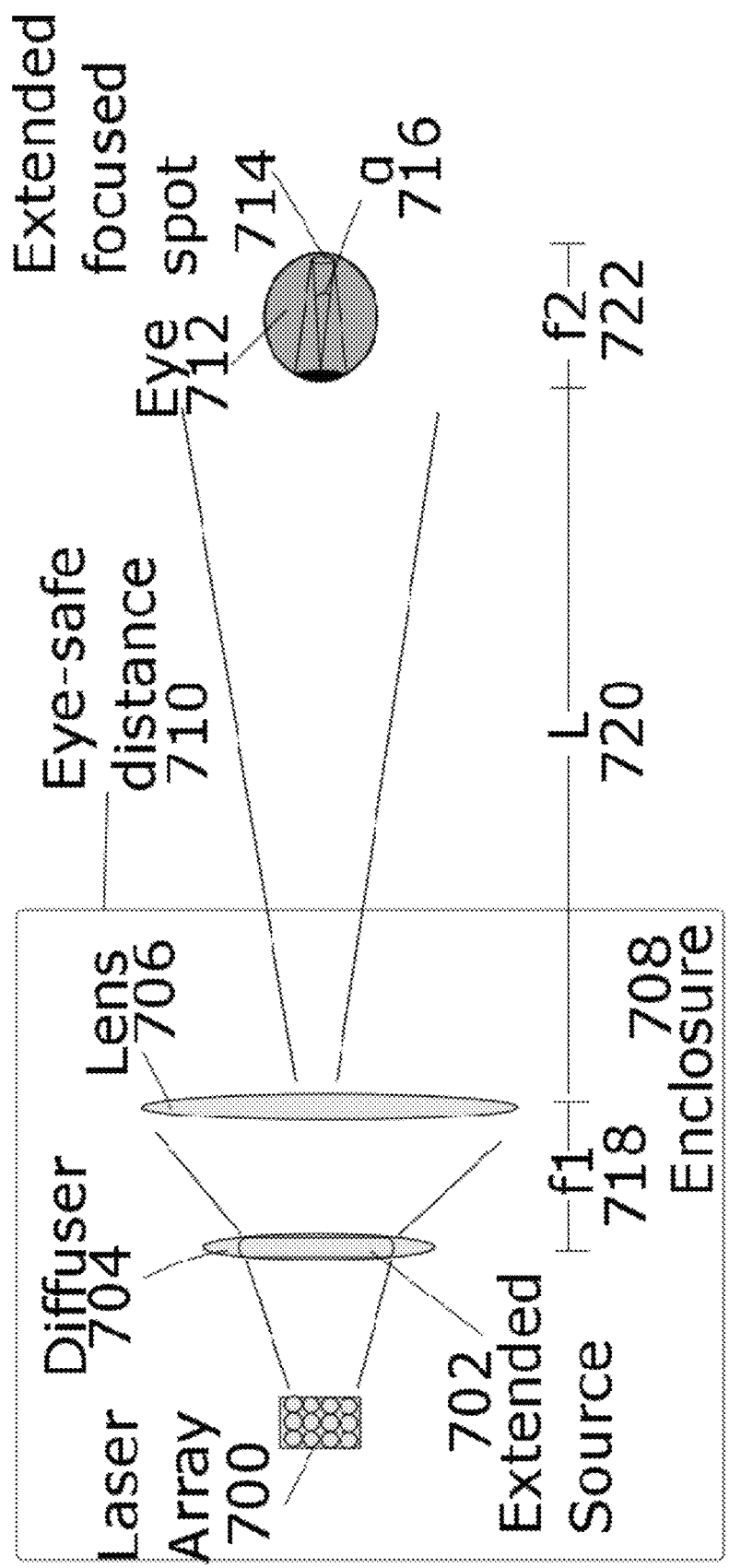
FIG. 7 illustrates an optical communication system including a diffuser, according to various example implementations.

FIG. 7 shows one such system where the laser array 700 is itself an extended source, and a diffuser 704 is placed after it, making a larger extended source 702. The diffuser also can diverge the light rays faster, making the spot size larger at a closer distance which reduces overall footprint. The light from the diffuser hits a lens 706 of focal length f1 718 and travels some distance (L) 720 before hitting the eye 712. The eye 712 focuses the image to an extended spot 714 on the retina. The focal length of the eye is denoted by f2 722. The angle, alpha (α) 716 is given by the image size on the retina divided by f2.

$$\alpha = \frac{\text{image size on retina}}{f2} = \frac{f2 * \text{extended spot size}}{f1 * f2} = \frac{\text{extended spot size}}{f1}$$

where the extended spot 702 is dependent on the divergence angle of the laser and the distance to the diffuser in the above case. The maximum power density that the eye may safely receive is dependent on alpha (a), the wavelength, and the exposure time.

Multiple Wavelengths

In some example implementations, more than one optical wavelength will be used. In some cases, the bandwidth per wavelength is limited by the performance of one or more components. The system bandwidth may be increased by using multiple wavelengths. Wavelengths may range from the UV to the deep IR. Different wavelengths will have different advantages. For example, using wavelengths longer than ~800 nm, but shorter than ~1000 nm may be advantageous because they have very low responsivity in the human eye, and thus are not readily perceived, but can be detected by silicon detectors, which are typically lower in cost and have lower noise floors. Wavelengths beyond 1000 nm may be advantageous because there is no responsivity in the human eye and can be detected with InGaAs detectors. One advantage to using InGaAs detectors is they are used in large volume in the fiber optic telecom industry and thus their cost to manufacture is continuously decreasing.

In some example implementations, the XRIDs may use one wavelength for optical communications up to the base station and the base station may use a different wavelength for communications down to the XRID. This may be particularly useful in configurations where the transmitter and receiver share some of their optical path and may be more susceptible to crosstalk between the local transmitter and receiver. For example, in the case where the transmitter and receiver are co-axial in the XRID and share a pointing mirror or optic, there are crosstalk paths where the transmit light is reflected or scattered off of the optics or other surfaces and ends up at the receiver. Since the receiver threshold may be on the order of 1/1,000,000 of the transmit launch power, it does not take much crosstalk to overpower the signal from the other end of the link. One uncoated optical surface can reflect 4% of incident light and reach the receiver at a level that is orders of magnitude above threshold.

Multiple wavelengths can also be used to increase the number of XRIDs in a given physical area. Each XRID may have one or two or more designated wavelengths, either a shared uplink and downlink wavelength or one wavelength for uplink and another wavelength for the downlink or multiple wavelengths that can be selectively used either to reduce crosstalk between multiple users or to overcome equipment failures at a particular wavelength. Using multiple wavelengths for multiple users is also a way to reduce the crosstalk between the base stations and XRIDs.

Figure 8:
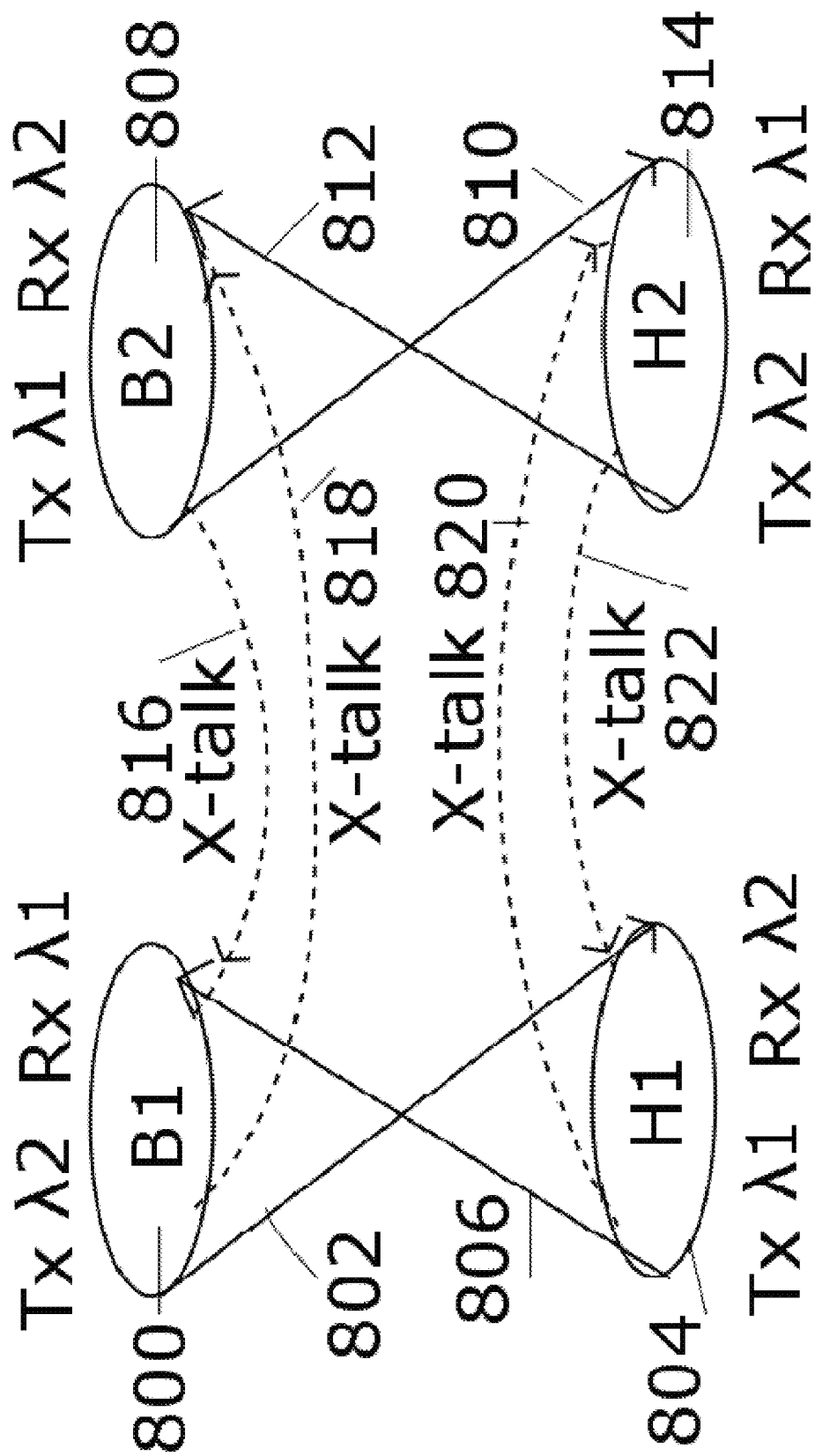
FIG. 8 illustrates how cross-talk from base stations to XRID might be reduced, according to various example implementations.

FIG. 8 shows one example of how cross-talk from base stations to XRIDs might be reduced. Here, there are two base stations denoted B1 800 and B2 808 and two) (IUDs H1 804 and H2 814, although generally this could be true for any number of) (IUDs, base stations and wavelengths. B1 has a transmitting wavelength, $\lambda 2$ which is directed towards H1 804 by the arrow 802. H1 804 has a receiver of wavelength $\lambda 2$. H1 804 has a different transmitting wavelength, $\lambda 1$ which is received by B1 800 denoted by arrow 806. Similarly, B2 808 has a transmitting wavelength $\lambda 1$, received by H2 814 denoted by the arrow 810 and H2 814 transmits back $\lambda 2$ to B2 808 denoted by the arrow 812. The cross-talk opportunities here are between B1 800 transmitter and B2 808 receiver denoted by the dashed arrow 818, B2 808 transmitter and B1 800 receiver denoted by the dashed arrow 816, H1 804 transmitter and H2 814 receiver denoted by the dashed arrow 820, and H2 814 transmitter and H1 804 receiver denoted by the dashed arrow 822. These situations however, are much less physically likely due to the setup geometry. The most likely cases of cross-talk for multiple users in a space especially if the users are moving around, would be between B1 800 and H2 814 and B2 808 and H1 804. However, since these operate on different wavelengths, cross-talk between them is minimized.

In some example implementations, multiple wavelengths could be used for communications between user to user versus users to a base station. This could include one or more wavelengths for separate uplink and downlink communications and inter-user communications.

In some example implementations, tunable lasers and/or filters may be used. In these cases, wavelengths may be assigned and reassigned as needed. This wavelength assignment may be set on the device for example by setting switches or via a user interface or may be assigned via another communications channel such as RF, mm wave or other.

Coverage Areas

Figure 9B:
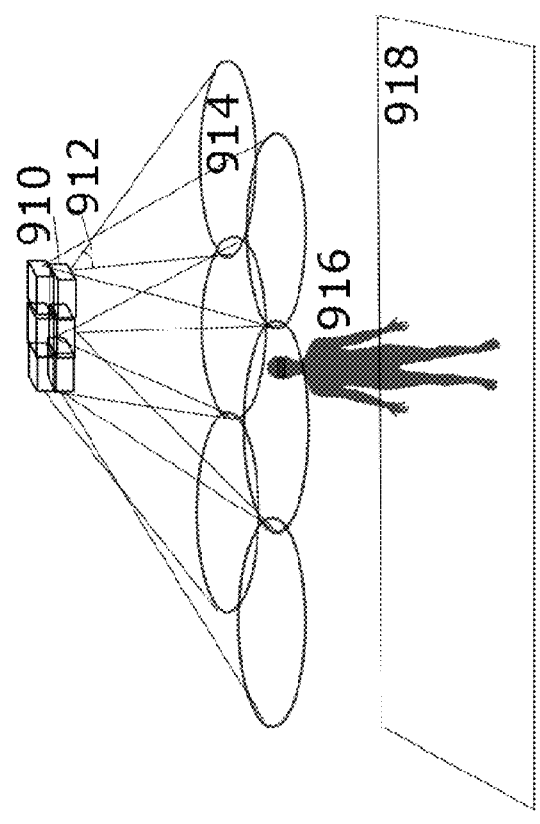
FIGS. 9A and 9B illustrate two different types of coverage areas, according to various example implementations.
Figure 9A:
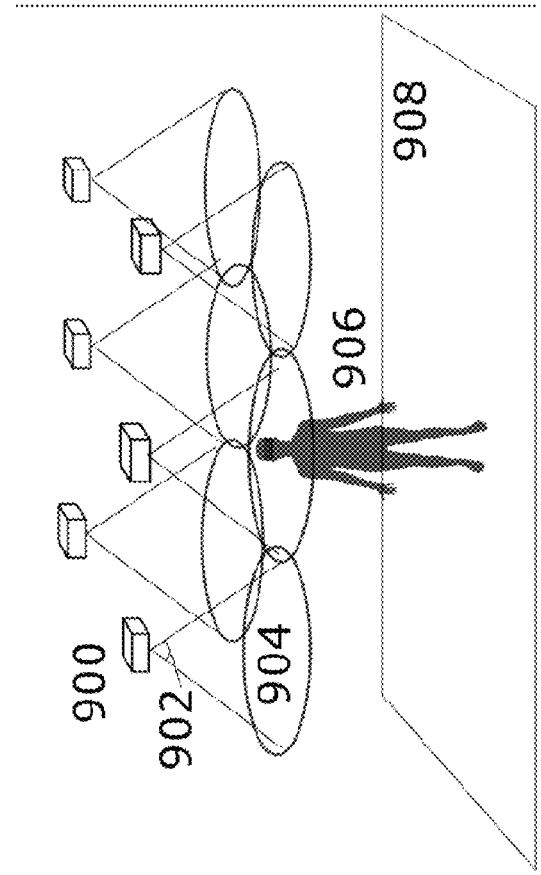
Figure 10A:
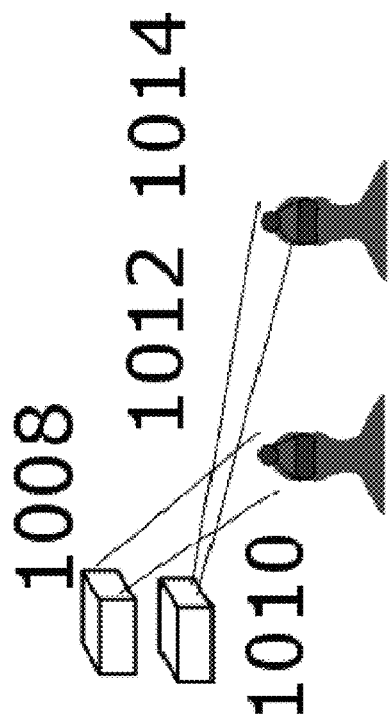
FIGS. 10A, 10B, 10C and 10D illustrate several possible options for setting up communications between users and base stations, according to various example implementations.
Figure 10B:
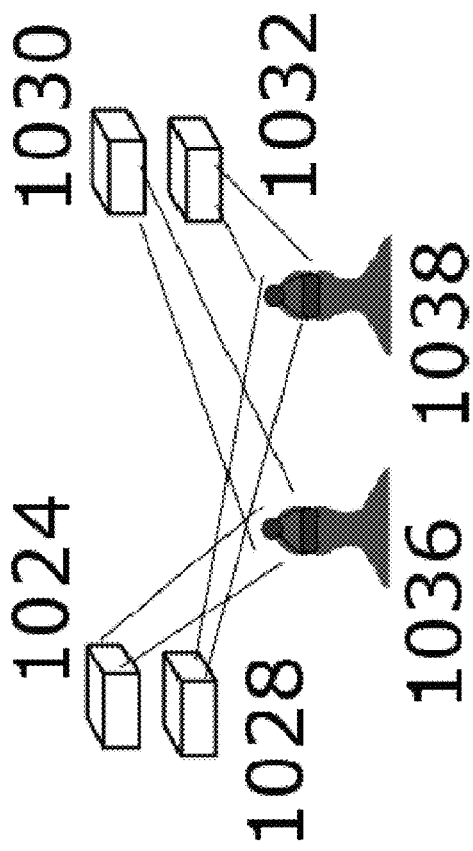
Figure 10C:
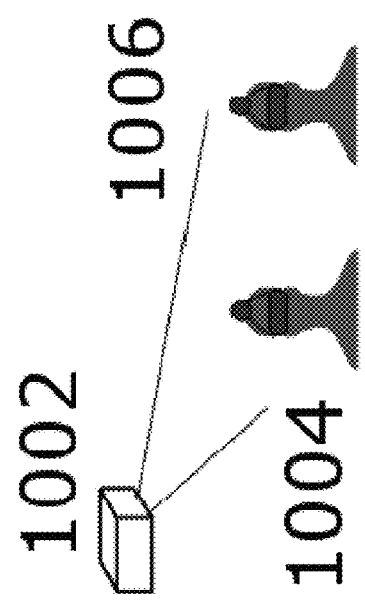
Figure 10D:
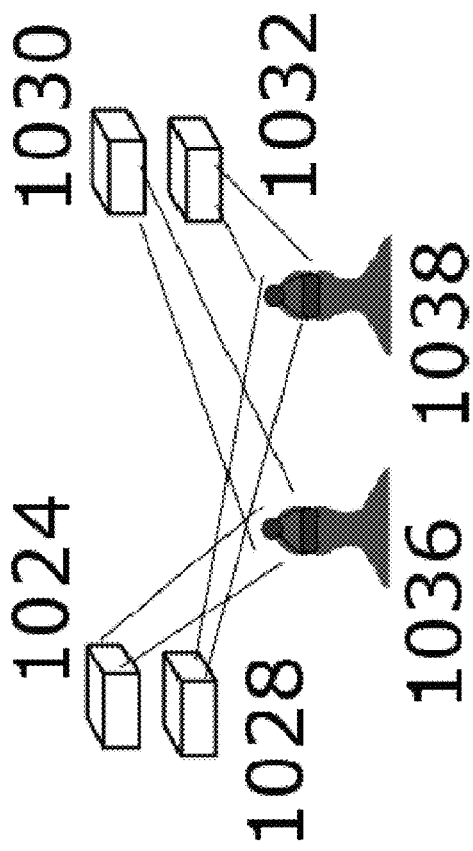

There are multiple ways to provide transmission of optical data over a physical area. In some example implementations each transmitter has a coverage area that is set by the divergence of its emitter. Larger areas may then be covered by having multiple lasers either co-located, but pointing in different directions, at multiple locations or by some combination thereof. FIGS. 9A and 9B show two different types of coverage areas. In FIG. 9A, there are multiple nodes 900, spaced around a room 908. Each node's transmitter has a divergence angle 902 which translates into a certain coverage area 904 in the plane of the user's 906 head. The nodes 900, are spaced such that their coverage areas 904 slightly overlap so that the user has a seamless transition from one to the next. In FIG. 9B, multiple nodes 910 are located in the same area within the room 918. Each of the nodes 910 is pointed in a different direction in order to provide coverage area. Each node has a divergence angle 912 which translated to a coverage area 914 in the plane of the user 916. The advantage or disadvantage to either of these setups is room-dependent, but the transmission and coverage provided is the same in each of the cases. The divergence angle of the transmitters may be set by the intrinsic divergence of the laser or emitter, or by use of optical elements such as diffusers, which generally broaden the natural divergence, or by lenses, which may either increase or decrease the divergence.

In some example implementations, the transmission links may be configured to allow multiple users within the coverage area of a given transmitter. These users may either share the same data or they may require different data. This maybe done via either time division multiplexing or wavelength division multiplexing. In time-division multiplexing, a single source beam carries both users' information, but each user is allocating a set time portion of the beam. This generally reduces bandwidth per user, but also reduces the need for multiple transmitters. In wavelength division multiplexing, there are multiple emitters emitting different wavelengths and each separate user has their own wavelength channel. This method allows users access to the full bandwidth, but may increase the complexity of the transmitters in some cases. In some example implementations, the wavelengths may be tunable. In some example implementations, the tunable lasers may be dynamically adjusted and allocated to different users at different times.

FIGS. 9A and 9B show the nodes are shown 900, 910 as discrete boxes, but as XR becomes more widespread, these boxes may be integrated into the infrastructure of a particular location. As an example, nodes may be integrated into light fixtures, similar to designs that have been proposed for Li-Fi. Other locations include walls, ceilings, network equipment both indoors and outdoors.

FIG. 10 shows several possible options for setting up communications between users and base stations. FIG. 10A shows the case where a single base station 1002 transmits data to two users 1004, 1006. These users will either receive the same data, or they will time-share the data—one user 1004 gets up to half of the time-slotted data while the other user 1006, gets up to the other half. FIG. 10B shows a configuration where there are two base stations 1008, 1010 and two users 1012, 1014. One base station transmits data to one user in this scenario. Multiple wavelengths can be used to reduce cross-talk as previously mentioned. The base stations could track the users or be stationary and provide wide coverage areas. FIG. 10C shows a configuration where there is a single base station 1016 and two users 1018 and 1020. The base station 1016 transmits data to one user. There is a second link between one user 1018 and the other 1020 denoted by 1022. Data from the base station 1016 then gets relayed to the second user 1020 via the optical link between users 1022. FIG. 10D shows a system where there is more than one base station per user. Here, there are two base stations per user, 1024 and 1030 are both sending data to user 1036 and base stations 1028 and 1032 are sending data to user 1038. Multiple base stations per user can be used to create more coverage, have redundancy in the link, or potentially be multiplexed for either higher speeds or so each base station could send data at a lower rate.

Pointing

One of the advantages of DBFSO systems is that they may be used in conjunction with pointing and tracking systems where the pointing and tracking systems may be lower cost and complexity than what is needed for collimated beam FSO systems. The DBFSO systems may have a beam divergence that ranges from a few milliradians up to 180 degrees. Typical FSO systems have beam divergences of 100 microradians and below. This directly impacts the pointing system required. If a beam has a divergence of 100 microradians, then the motor system must have at least 126,000 positions to cover 2 pi range of pan. To cover 2 pi sterradians requires about 629 M different positions. In a DBFSO system with 2 milliradians of divergence, only 1.5 M positions are required to cover 2 pi sterradians and this drops to 5.4K positions if the divergence is 34 milliradians (2 degrees). The cost and complexity of the pointing systems scale with the number of positions that must be covered so the DBFSO will significantly reduce the cost of pointing.

This section describes some example implementations that integrate pointing and tracking systems into DBFSO communications links.

Figure 11A:
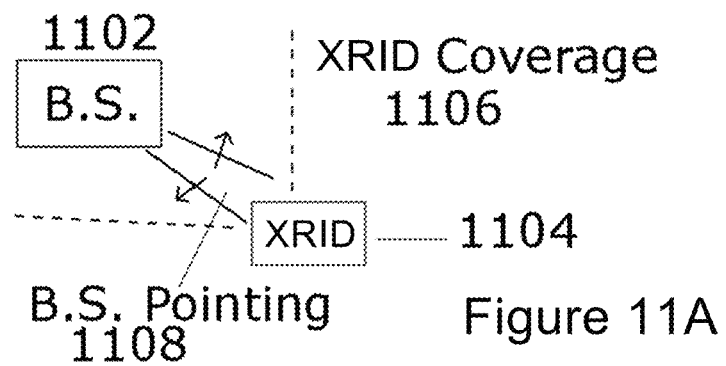
FIGS. 11A, 11B and 11C illustrate pointing of either or both the base station or XRID, according to various example implementations.
Figure 11B:
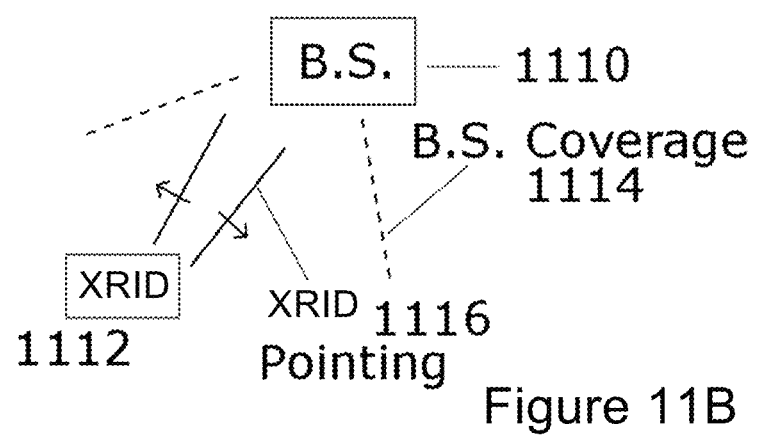
Figure 11C:
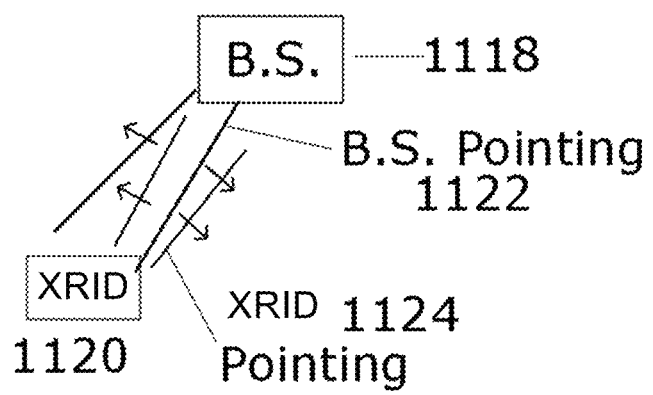

In some example implementations, the coverage area of a transmitter or a receiver is increased beyond its inherent divergence or acceptance through the use of pointing. The laser or detector may have an inherent coverage area, which is then moved across a coverage area using a steering mechanism. This may include both pan (horizontal movement) and tilt (vertical movement) or some other set of near orthogonal axes. FIGS. 11A, 11B and 11C shows several of the example implementations listed below.

In some example implementations, the base station (FIG. 11A) 1102 transmitter and/or receiver may be pointed to cover the XRID 1104 as it moves. Either the transmitter or receiver may not be moved, but may have a larger inherent coverage area. The pointed beam 1108 has a small coverage area, but is mainly steered while the XRID 1104 has a static larger coverage area 1106 and does not require pointing.

In some example implementations (FIG. 11B), XRID 1112 transmitter and/or receiver may be pointed 1116 to maintain alignment with the base station 1110 as the XRID 1112 moves. Either the transmitter or receiver may not be moved, but may have a larger inherent coverage area. The base station 1110 may have a larger coverage area 1114 as well and not require pointing.

In some example implementations (FIG. 11C), there will be pointing on both the base station 1118 and the XRID 1120. Here, the base station 1118 pointing is denoted by 1122 and the XRID 1120 pointing is denoted by 1124. Again, either the transmitter or receiver on either the base station 1118 or XRID 1120 may not be moved, but may have a larger inherent coverage area.

In some example implementations, the pointing may be implemented by moving a lens in front of the transmitter and/or receiver. FIG. 12A shows such an implementation where a laser 1200 emits light that is focused by a lens 1204 into an on-axis diverging beam. If the lens 1206 is moved off axis, this results in the light from the laser array 1202 being steered 1210. In some example implementations, the pointing may be implemented by controlling a liquid lens that points the transmitter and/or receiver. A possible example of this implementation is shown in FIG. 12B where a laser array 1212 emits light that hits a liquid lens 1214. The lens can either focus the beam into the diverging nominal beam 1222, or it can focus the beam into a more collimated or more diverged beam 1224 or it can steer the beam 1220 or any combination thereof.

Figure 12C:
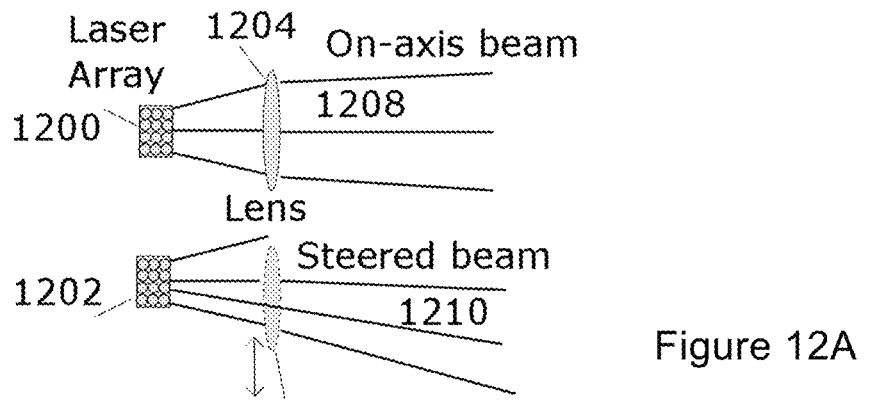
Figure 12C:
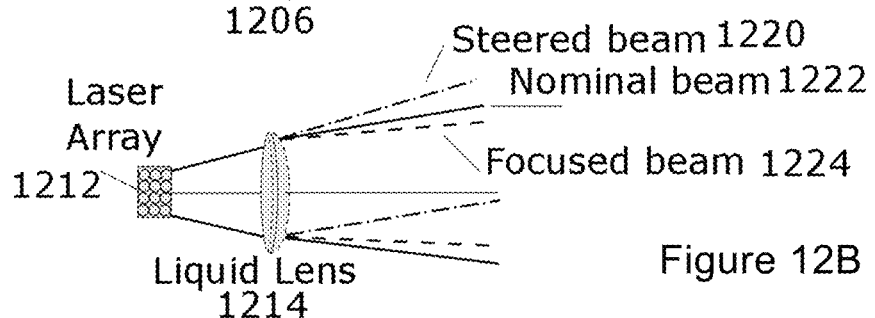
Figure 12C:
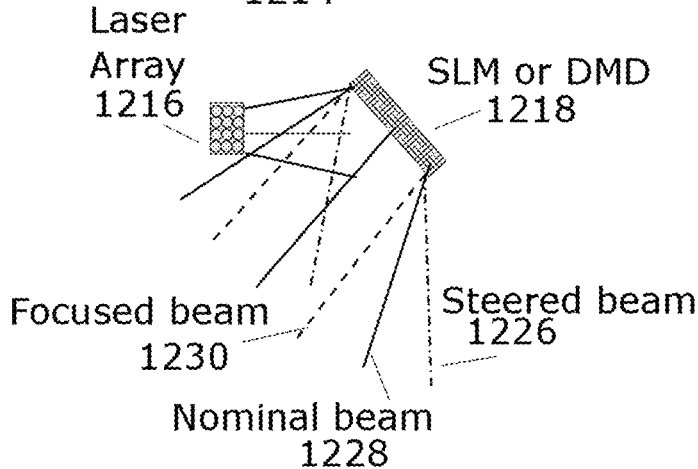

In some example implementations, the pointing may be implemented by a spatial light modulator (SLM) or deformable mirror device (DMD). An example of this implementation is shown in FIG. 12C. The laser array 1216 emits light that hits an SLM or DMD 1218. The SLM or DMD can focus the beam 1230, or steer the beam 1226 from the standard nominal beam 1228.

Figure 13A:
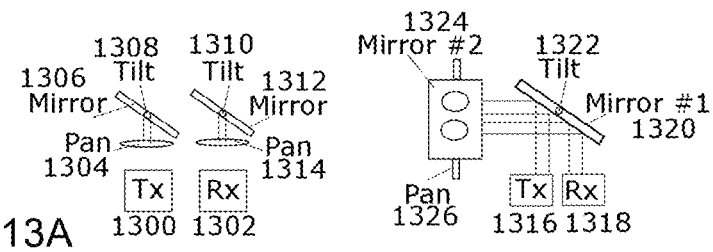
FIGS. 13A, 13B and 13C illustrate how pointing may be implemented according to other examples.

In some example implementations, the pointing may be implemented by moving a mirror in front of the transmitter and/or receiver. An example of one such implementation is shown in FIG. 13A. Light from the transmitter (TX) 1300 is steered by a mirror 1306. The mirror 1306 is on a mount that has both a pan stage 1304 and a tip axis point 1308 for two dimensional steering capabilities. Similarly, light is guided into the receiver (RX) 1302 via a mirror 1312 that also has a pan stage 1314 and a tilt axis point 1310. These mirrors have a limited range they can steer over since they are single sided mirrors.

Another steering implementation involves separating the pan and tilt stages. Here, for example, both TX 1316 and RX 1318 sit behind the same mirror (Mirror #1) 1320 which tilt both the transmit and receive beams. There is another mirror (Mirror #2) 1324 which is on a pan mount 1326 that rotates in the orthogonal direction and similarly steers both beams.

In some example implementations, the mirror may be dual sided. The mirror may rotate around an axis aligned with the optical center of the transmitter and/or receiver. The mirror may tilt around an axis perpendicular to the optical axis. There may be one mirror for the transmitter. There may be one mirror for the receiver. There may be one mirror for both the transmitter and the receiver. In this case the transmitter and receiver may then be separated by a dichroic filter with the transmitter having one wavelength and the receiver having a second wavelength. Or the transmitter and receiver may be separated by a power beamsplitter. Or the transmitter and receiver may be separated by a polarizing beamsplitter.

Figure 13B:
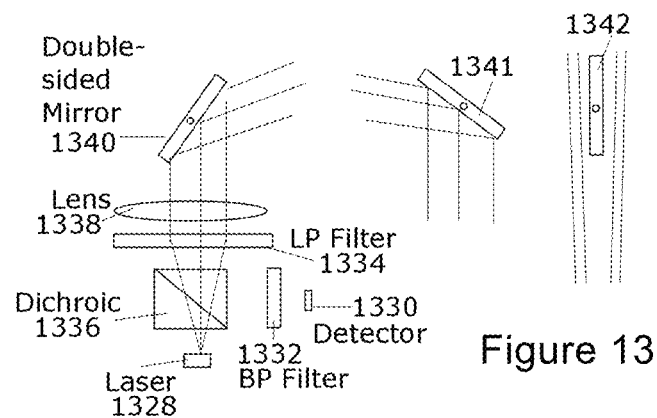

An example of one such implementation is shown in FIG. 13B. Light from the laser 1328 travels straight through the dichroic beam splitter 1336, gets focused by the lens 1338 and then steered by the double-sided mirror 1340. Similarly, light from another TX (with a different wavelength), hits the steering mirror 1340 and gets focused by the lens 1338 through the dichroic 1336 and takes the orthogonal path through a bandpass filter 1332 and finally to the detector 1330. A longpass filter (LP filter) 1334 is placed adjacent to the lens 1338 to filter out excess background light. The double-sided mirror 1340 can steer the light in either direction as shown with 1341 and 1340 or cannot steer at all such as in 1342.

Figure 13C:
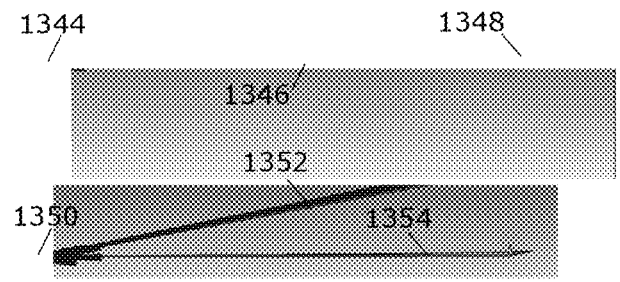
Figure 13C:
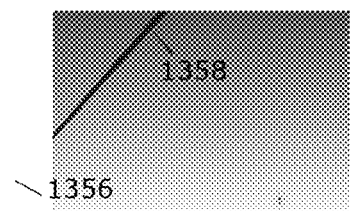

FIG. 13C shows three different potential mirror configurations and how each results in a different beam steering case, although it should be understood that other configurations or implementations of pointing may be used. The first case is when the mirror 1344 is parallel to the transmit beam 1346. In this case, the mirror does not block the transmit beam 1346 or steer it in any way so the resulting light ends up following its nominal path to the receiver side 1348. In another case, the mirror 1350 steers the beam 1352, but only part of the beam lands on the mirror 1348 and is steered. The other part of the beam 1354 passes by the mirror 1348 and continues on the original path 1346. Yet another case is when the entire beam 1358 lands on the mirror 1356 and is steered. There is then no light in the original direction.
Tracking In some example implementations, there will be a feedback mechanism to allow the endpoints (base station or XRID) to track the location of the other endpoint (XRID or base station) as the XRID moves within a user area.

Some example implementations of tracking may use one or more cameras. The cameras may be setup anywhere in the space with a field-of-view that covers the area where the XRID may be located. Image recognition may be used to determine where the XRID or user is in the space, and data fed back to the transmitter for pointing. Other example implementations may use a LED or other light source. The light source may be at a particular wavelength or may blink at a known frequency. Different base stations or XRIDs may blink at different frequencies to allow identification. Blinking may also be used to convey other information.

Figure 14:
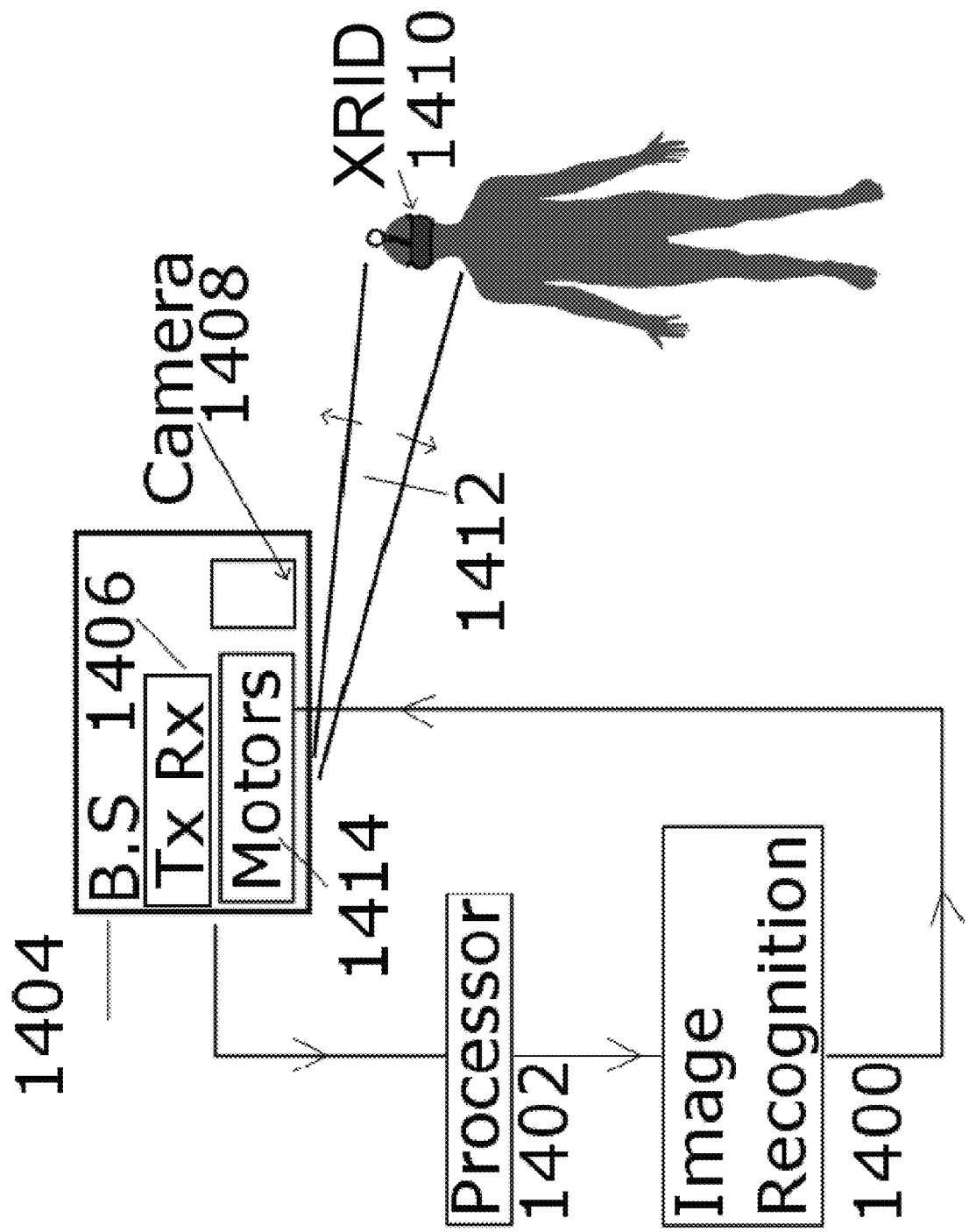
FIG. 14 illustrates a tracked system, according to various example implementations.

FIG. 14 shows an example of a tracked system. The base station 1404 contains a transmit/receive pair (TX RX) 1406, a camera 1408 and motors 1414. The emitted beam 1412 has some small coverage area for the user's XRID 1410. The camera 1408 sends the images back to the processor 1402, which will perform image recognition 1400 with either integrated or separate software. The feedback from the image recognition 1400 is then sent to the motors 1414 to adjust the beam steering.

In some example implementations, the tracking system may use a quad detector (or four separate detectors). In this example implementation, an optical signal from the other end of the link would be equally balanced on the quad or four detectors, if the user was pointed directly at the source. If there is an imbalance in the signals of the detectors, that data may be fed to the transmitter so that it can be repointed. Optical signal may be modulated at some frequency to allow identification, to transmit information, or to reduce power consumption.

An example of this is shown in FIG. 15A. The base station 1500 receives light from an LED 1512 on the XRID 1514 of a user. A lens 1510 focuses this onto a quad detector 1502. Each element of the quad detector 1516 is separated by a baffle 1530. The signal strengths on each detector can be used to calculated the position of the LED. For example, in the vertical directions detector #3 is subtracted from detector #1 to give a positive or negative value for movement in this direction. Similarly, detector #4 is subtracted from detector #2 to ascertain the imbalance in the horizontal direction. The processor 1504 calculates these values and the needed adjustment directions and feeds them into the motors 1506 which are then used to steer the TX and RX 1508.

Some example implementations may use 3 detectors. These example implementations follow the same idea as the quad detector case, but balance the signal across 3 detectors. As in the previous example implementation the optical signal may be modulated at some frequency to allow identification, to transmit information, or to reduce power consumption.

An example of this example implementation is shown in FIG. 15B where each element of the 3 detector array 1518 is separated by a baffle 1520. In this case where each detector covers 120 degrees; the equations for determining the direction are modified from the quad detector case in the following way. In the vertical direction the average of detectors #2 and #3 are subtracted from #1. In the horizontal direction, detector #3 is subtracted from detector #2.

Some example implementations of tracking may use RF. These example implementations use GPS or other location data and sends that information back to the transmitter for repointing. An example of this example implementation is shown in FIG. 15C. A base station 1522 tracks the location of an XRID 1528 using a GPS chip 1526 and RF communication 1524.

Modulation Schemes

In some example implementations, the data may be encoded on the optical beam using pulse amplitude modulation (PAM). In some example implementations, there are multiple amplitude levels that encode multiple pieces of information using different levels. The phase may also be varied to increase the amount of information represented.

One example implementation of PAM is On/Off keying (OOK) where digital data is represented by the laser being turned on for a 1 and off for a 0. This is a relatively simple modulation scheme with straightforward implementation. It requires a 50/50 duty cycle from the laser and may consume more power on average than other modulation schemes. One feature of OOK is that there are occasionally long periods with the laser is either on or off some example implementations may use a scrambler/descrambler to minimize the number of consecutive 1's or 0's, i.e., the amount of time that the laser is either on or off. This may also be thought of a limiting the lowest frequency of modulation.

Figure 16A:
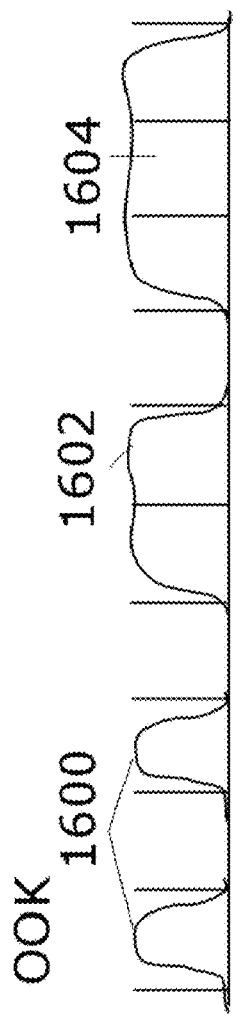
FIGS. 16A, 16B and 16C illustrate modulation schemes, according to various example implementations.

An example of OOK is depicted in FIG. 16A. Here, each unit of time has either a pulse or no pulse in it denoting the "1" or the "0". The pulses shown can either be one bit period long 1600, or 2 bit periods long 1602, three bit periods 1604 or more, but on average, there are an equal number of 0s and 1s. Bit periods are as long as a single pulse which is determined by the speed of the modulators, laser, and transmit printed circuit boards.

In some example implementations, the data may be encoded using pulse position modulation (PPM) or variants thereof. In some versions of PPM time is divided into discrete frames with the frames then being further divided into bins. In each frame there will be one pulse of light in one of the bins. Frames are typically set up with 2^N time bins and so that each frame encodes N bits of information. For example, a frame could have 8 time bins. In each frame, one of the 8 bins will have a pulse of light in it. The frame can then take on values from 1 to 8 or 3 bits worth of data. In general, the power requirements for PPM are lower as the duty cycle is lower, the SNR is higher relative to OOK, but there is a trade-off in the bandwidth of the channel in the standard PPM setup. This may be advantageous in these applications (XR) as the system needs to be eye-safe and have a large angular coverage range.

Figure 16B:
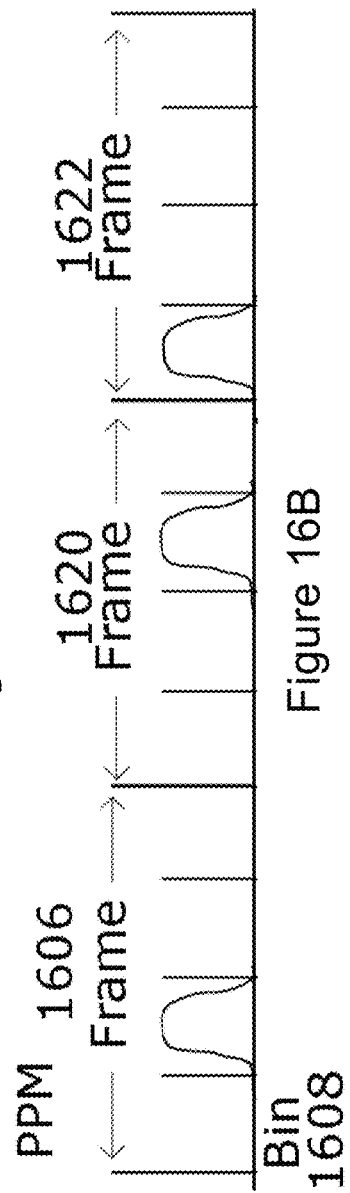

FIG. 16B shows an example of PPM. Here, each frame 1606, 1620, 1622 is made up of 4 time bins 1608. A pulse is assigned to one of the bins in each frame. This particular setup encodes two bits of information per frame but has ¼ of the speed of OOK, for a total bandwidth of ½ that of the OOK system.

In some example implementations of PPM one or more guard bins can be added to each frame. This is particularly useful in the case where the rise time of the laser (and modulator) is shorter than the overall pulse duration. As an example, some combinations of lasers with modulators may have a rise time of 300 ps but an overall bandwidth (and hence minimum pulse width) of 700 MHz or 1 ns. Using standard PPM with an 8 bin frame, the maximum data rate would be 1 Gbps*3/8=375 Mbps. However, if the bin width is 333 ps (very close to the rise time) and there are 2 guard bins at the end of the frame (in case the pulse falls in the last time bin), the data rate is now 3 bits in 10 bins or 900 Mbps. This can be used across a range of bins, frames, and guard bin sizes to optimize the data throughput and SNR for various noise conditions.

Figure 16C:
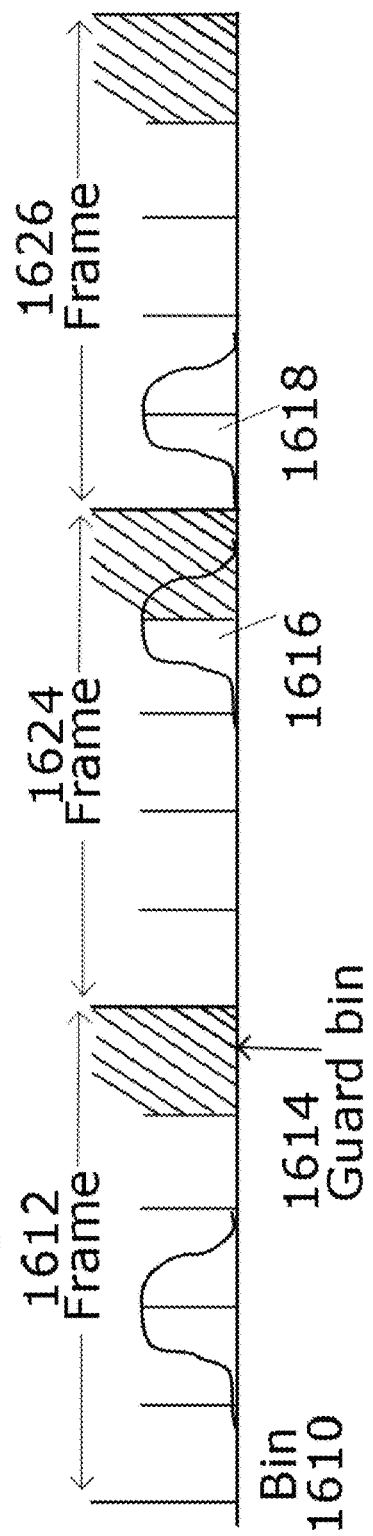

FIG. 16C shows a version of PPM with a guard bin 1614. Here, again, time is split into frames 1612, 1614, 1626 with each frame having 4 time bins 1610 and a guard bin 1614. In the first frame 1612, the pulse rises in the second time bin and falls in the third, so there would be no interference with the next frame. In the second 1624 and third 1626 frame the pulse 1616 in the second frame 1624 falls in the guard bin while the pulse 1618 in the third frame rises in the first time bin. The guard bin serves to keep this pulses from temporally overlapping and causing errors in the data stream.

Integrated Optics and Wireless

Some example implementations may have communications links that are a combination of optical wireless and other wireless technologies. For example, the downlink to the XRID may be diverged beam optical while the uplink is RF (Bluetooth, Wi-Fi, or other). In another example implementation the downlink would be both optical and RF wireless and the uplink would be RF wireless. In another example implementation, both the downlink and uplink would be both optical and RF wireless.

Figure 17:
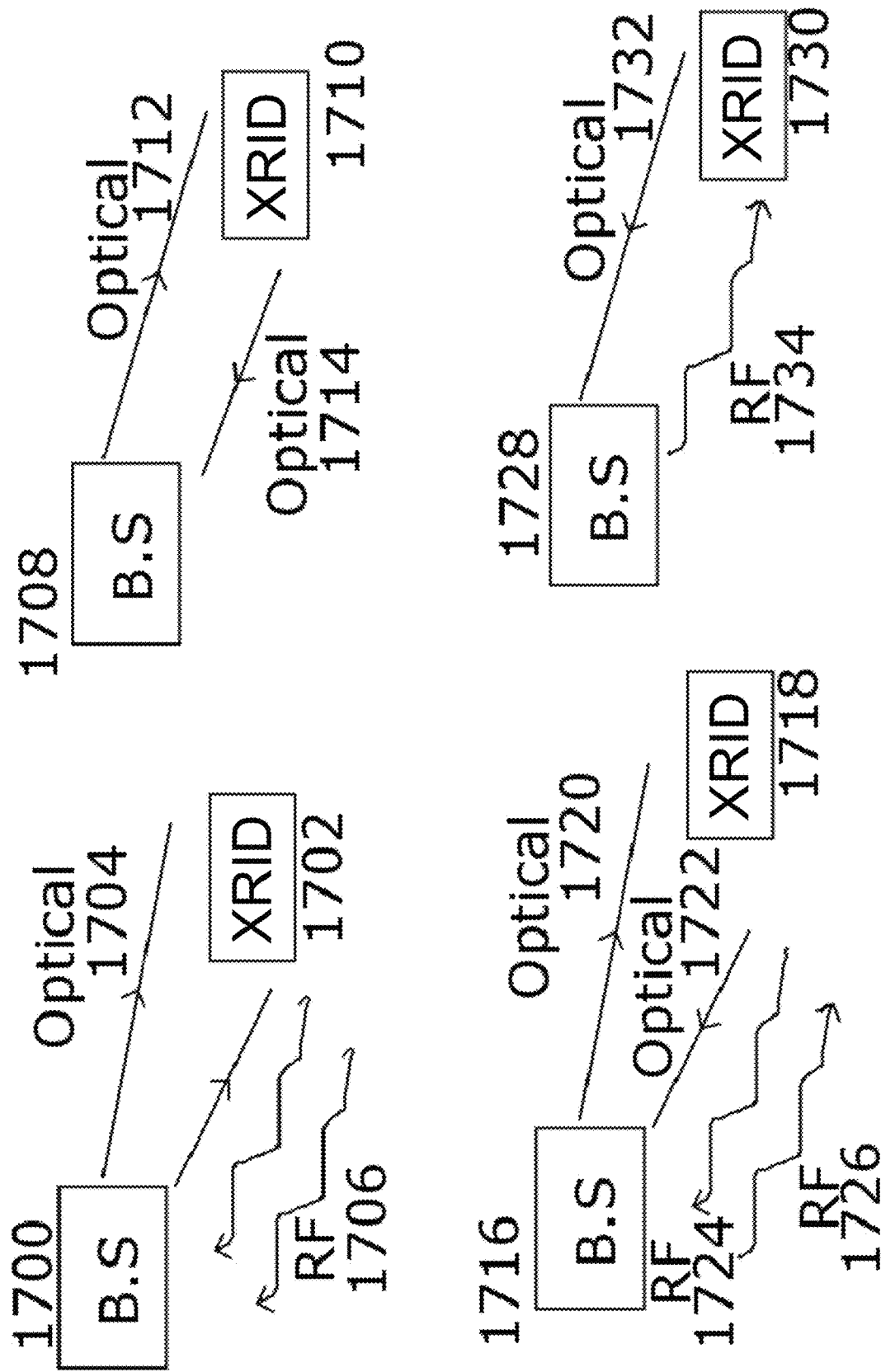
FIG. 17 illustrates some of the potential combinations of optical wireless and other wireless technologies, according to various example implementations.

FIG. 17 shows some of the potential combinations of optical wireless and other wireless technologies. In some cases, the base station 1700 communicates to the XRID 1702 via optical wireless and the XRID 1702 communicates back to the base station 1700 with a RF link 1706. The base station 1708 and XRID 1710 can also communicate solely using optical wireless for both the downlink 1712 and the uplink 1714. The base stations 1716 and XRID 1718 can communicate using both RF and optical. Here, the XRID 1718 has both an optical link 1722 and RF 1724 to the base station and the base station has both an optical link 1729 and RF link 1726 to the XRID. Finally, the base station 1728 can send data to the XRID 1730 over an RF link and the XRID 1730 can send data to the base station 1728 with and optical link 1732.

XRID Location and Orientation

In many XR systems it is important to know the location and orientation of the XRID as well as any changes that occur. This information may be used to generate or modify the information sent to the XRID for video display, audio, or other. In some example implementations, the system may also have the capability to provide both the location and orientation of the XRID relative to one or more base stations or some other location. This will be referred to as integrated tracking. This may be done by some or all of the same hardware that is used for the communications between the base station and the XRID. This is in addition to location and orientation information that is generated by other hardware and then transmitted either up or down by the optical link.

Time-of-flight for location—in some example implementations the location of the XRID relative to the base station may be calculated using time-of-flight information from the light pulses. These pulses may be the same pulses as used for communications or they may be different pulses used specifically for locating the XRID. In air, light travels ~0.3 meters (30 cm) per nanosecond (based on 3.0×10^8 m/sec velocity of light in vacuum). If the receiver has 100 picosecond resolution, then the distance resolution is 3 cm and at 10 picosecond resolution it is at 0.3 cm or 3 mm.

The system may determine position by calculating time-of-flight from base station to XRID. In other example implementations, it may use time-of-flight from XRID to base station. In yet another example implementation, it may use time-of-flight from base station to XRID, processing time in XRID and time-of-flight back to base station (or vice versa). In all of these example implementations, a synchronized clock may be needed to enable precision time of pulse launch and/or arrival on either need of link (i.e., base station or XRID).

Figure 18:
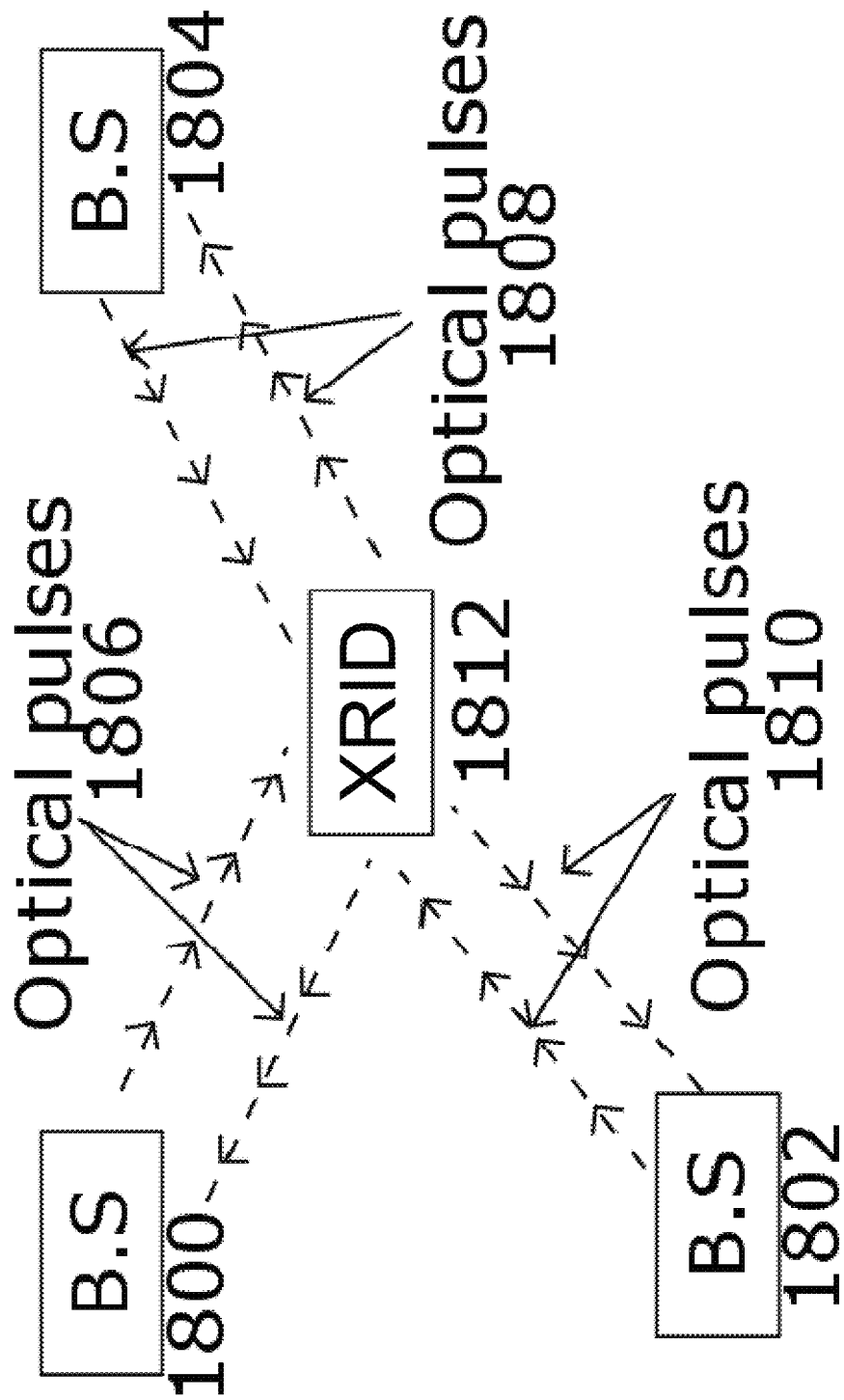
FIG. 18 illustrates using time-of-flight information to locate an XRID, according to various example implementations.

FIG. 18 shows an example of using time-of-flight information to locate a XRID 1812 in a space using three base stations 1800, 1802, 1804. Each base station 1800, 1802, and 1804 sends optical pulses 1806, 1808, and 1810 respectively to the XRID 1812, which sends optical pulses 1806, 1808, and 1810 back to the base stations. Using time-of-flight from each of the base stations 1800, 1802, 1804 allows them to track the XRID 1812 around the room or space.

Multiple Users

XRID-to-XRID—in some example implementations the XRIDs may communicate directly with other XRIDs. FIG. 19A shows a base station 1900 that is communicating with an XRID 1902 which is within its coverage area 1908. For the example implementations that use coverage areas, if a second XRID 1904 is in the coverage area of a first XRID 1902, they may communicate directly with each other using the optical links. This communication may occur at the same time as communications with one or more base stations. For the example implementations using pointing systems, the two XRIDs may point their transceivers at each other to communicate optically with another XRID.

In some example implementations, a first XRID 1902 may act as a relay between a second XRID 1904 and a base station 1900. That is, XRID 2 1904 may send information to XRID 1 1902 via optical or other link 1906, and XRID 1 1902 may or may not perform some processing on the data, and then transmit the data to the base station 1900. Data from the base station 1900 follows the reverse path to get back to XRID 2 1904 via XRID 1 1902.

In some example implementations, each user may have a separate base station communicating with their XRID.

In some example implementations, there may be one base station communicating with more than one user using time-division multiplexing or wavelength division multiplexing.

In some example implementations, there may be one base station that communicates with one user and XRID-to-XRID link that communicates information for the second user via the first user. In this case, the second user would not need to be within the field of view of the base station.

In some example implementations, there may be more than one base station per user for one or more users.

In some example implementations, communications may occur only between XRIDs as in 1906, without communications to a base station.

In some example implementations, the XRIDs may be configured to only allow for communications such in 1906, and to prevent communications with outside parties, or awareness by outside parties that the communications 1906 are occurring.

In some example implementations, known signal processing techniques such as TDMA, CDMA, FDMA, and PDMA, or a combination of them may be used to ensure communications are not detectable beyond the intended 1906 links.

Figure 19B:
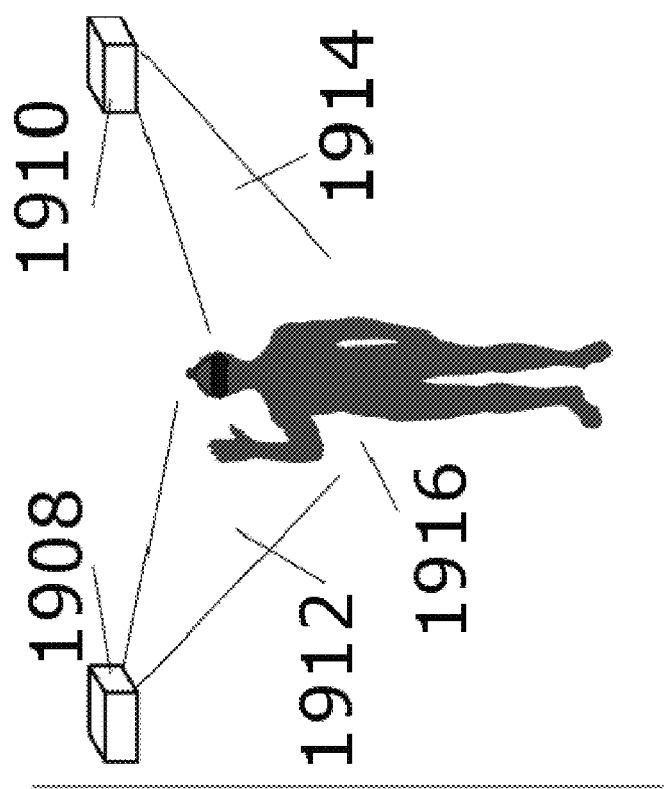
FIGS. 19A and 19B illustrate respectively XRID-to-XRID communication, and having more than one base station for a single user, according to various example implementations.
Figure 19A:
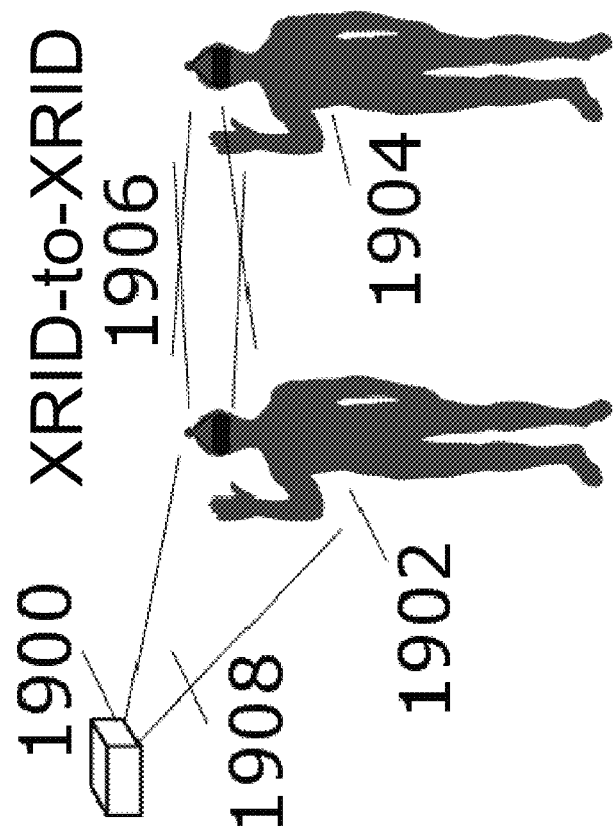

FIG. 19B shows an example of having more than one base station 1908, 1910 for a single user 1916. The user 1916 is within the coverage area 1912 for base station 1908 and the coverage area 1914 for the base station 1910.

In some example implementations, the XRIDs may also communicate directly with each other using RF links. These links may be Bluetooth, Wi-Fi, WiGig, or other frequencies or transmission protocols.

Level of Integration

In some example implementations, the link will interface to other manufacturers' XRIDs and base stations and/or computers. The electrical connections may be standard interfaces such as HDMI, USB, audio (analog or digital), Ethernet, or others. The base-station side of the link may be mounted to a tripod, wall, or other fixed location.

The XRID side of the link will attach to the XRID and provide the I/O to the XRID. I/O connection may interface to separate cables or the cables may be integrated into the XRID side of the link. There may be different implementations for different XRID manufacturers. These variations may include the physical interface required to attach to a particular XRID and/or different electrical/electronic I/O based on the I/O of a particular XRID. The link may be powered by the XRID or may have a separate battery. This battery may be integrated into the XRID side of the link or may be separate and connected by one or more wires. This battery may be designed to clip onto the user at a belt, pants, or other.

Figure 20B:
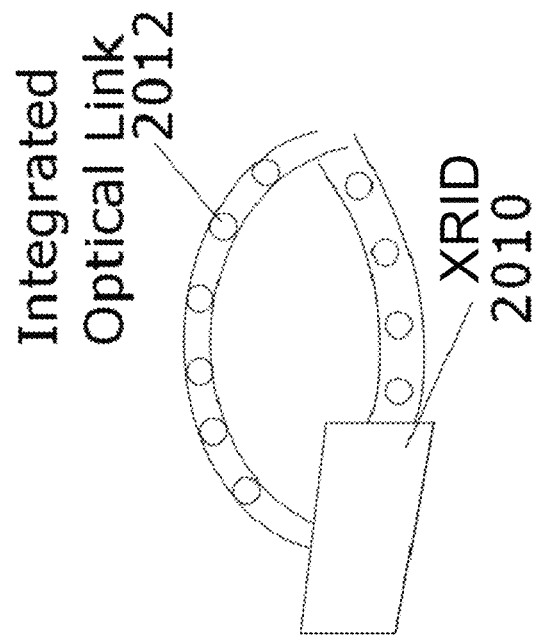
FIGS. 20A and 20B illustrate respectively an XRID having an optical link module, and an XRID having an integrated optical link, according to various example implementations.
Figure 20A:
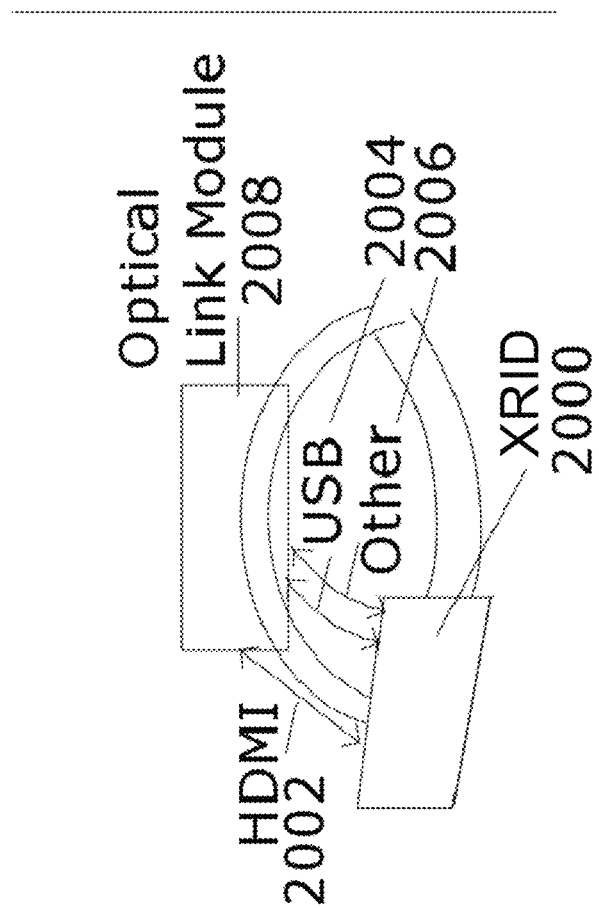

FIG. 20A shows an example of an XRID 2000 where the optical link module 2008 is attached to the straps and cables for HDMI 2002, USB 2004 and other cables or connections such as audio 2006 run between the optical link module 2008 and the XRID 2002.

In some example implementations, the base station and/or XRID may be tightly integrated into the rest of the system. They may be manufactured as one device. The integrated system could be completely designed and built by 8 Rivers or use components and licensed intellectual property from other suppliers along with parts designed by us.

In particular, the XRID may be one integrated unit designed and built by a single manufacturer. At minimum this would include at least one video display and an optical downlink that would receive information from a base station, format the information, and display on the video. The XRID may also include additional displays, cameras, audio speakers, microphones, location sensors, orientation sensors, location beacons (LED's, lights, etc.), optical uplinks, RF downlinks, RF uplinks (where RF covers MHz to 500 GHz), haptic sensors, haptic feedback, chemical sensors, chemical generators, body sensors (eye tracking, heartrate, blood pressure, pulse oximeter, temperature, brain waves, and others) and others.

FIG. 20B shows an XRID 2010 where the optical link 2012 is integrated into the physical XRID instead of as a separate module such as the optical link module in FIG. 20A.

Remote Connections

In addition to the example implementations, where the link primarily connects the XRID to the base station, there are example implementations where the XRID connects to other devices in other locations. There are cases where the base station is then connected to a local PC. This connection may be via a wired connection, a fiber optic connection or a diverged beam wireless connection.

Connect to internet—in some other example implementations, the base station may be connected directly to the internet. This connection may be via wired connection, an RF wireless connection, a fiber optic connection, a diverged beam wireless connection, a satellite connection or some other connection.

Connect to cloud—in some example implementations, the XRID may connect to a processing entity in the cloud. This processor may generate some or all of the AR/MR/VR data used by the XRID. This processor may use some of the data generated by the XRID. This processor maybe located anywhere. The connection to the processor from the base station may be via wired connection, an RF wireless connection, a fiber optic connection, a diverged beam wireless connection, a satellite connection or some other connection.

FIG. 21A shows an example of a base station 2102 that is communicating via an optical link 2104 with an XRID 2106, but also with the cloud 2100.

User to user (anywhere)—an XRID may connect to another XRID via an intermediate network. This network may transmit information from one XRID directly to another XRID with minimal or no processing along the way. That is, the two XRIDs may communicate with each other without using another processing in between. This path may include processing in the base stations or may use the base station purely as conduit to transmit information. Processing here means generating or modifying the information passed between the XRIDs.

FIG. 21B shows an example of one XRID 2112 connecting to another XRID 2125 via a network 2108. The first XRID 2112 has an optical link 2114 to the base station 2110 which is connected via a link 2116 to a network. The network is also connected 2118 to a different base station 2120, which is connected to XRID 2124 via an optical link 2122.

Configurations where an XRID connects back to a server controlling a network are also possible. One such example is shown in FIG. 21C where the XRID 2134 is connected via and optical link 2138 to a base station 2132. The base station is connected via a link 2136 to a network 2126 which ultimately connects back to a server 2128 via a link 2130, which is typically a hard wired link.

Many modifications and other implementations of the disclosure set forth herein will come to mind to one skilled in the art to which these disclosure pertain having the benefit of the teachings presented in the foregoing descriptions and the associated figures. Therefore, it is to be understood that the disclosure are not to be limited to the specific implementations disclosed and that modifications and other implementations are intended to be included within the scope of the appended claims. Moreover, although the foregoing descriptions and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An optical communication system comprising:
    a base station including an optical transmitter assembly configured to convert an electrical signal to an optical beam, and emit the optical beam in free space, uncollimated and with a divergence angle greater than 0.1 degrees; and
    an extended reality immersion device (XRID) including:
        an optical receiver assembly having an acceptance angle greater than 0.1 degrees, the optical receiver configured to detect the optical beam in free space, convert the optical beam to a corresponding electrical signal, and reproduce information carried by the corresponding electrical signal; and
        a head-up display configured to present the information,
    wherein the optical receiver assembly is configured to detect the optical beam on a communication channel between the XRID and the base station, and
    wherein the optical communication system further comprises another XRID, and the XRID further comprises an optical transmitter assembly configured to encode an electrical signal with the information, convert the electrical signal to a corresponding optical beam, and emit the corresponding optical beam in free space on another communication channel between the XRID and the other XRID, the XRID thereby configured to relay the information from the base station to the other XRID.

2. The optical communication system of claim 1, wherein the base station includes a pointing system configured to point the optical transmitter assembly in a direction of the XRID.

3. The optical communication system of claim 1, wherein the base station further includes a tracking system configured to track the XRID as the XRID moves, the pointing system configured to point the optical transmitter assembly in the direction of the XRID as tracked.

4. The optical communication system of claim 1, wherein the XRID includes a pointing system configured to point the optical receiver assembly in a direction of the base station.

5. The optical communication system of claim 1, wherein the XRID further includes a tracking system configured to track the base station as the XRID moves, the pointing system configured to point the optical receiver assembly in the direction of the base station as tracked.

6. An optical communication system comprising:
  a base station including an optical transmitter assembly configured to convert an electrical signal to an optical beam, and emit the optical beam in free space, uncollimated and with a divergence angle greater than 0.1 degrees; and
  an extended reality immersion device (XRID) including:
    an optical receiver assembly having an acceptance angle greater than 0.1 degrees, the optical receiver configured to detect the optical beam in free space, convert the optical beam to a corresponding electrical signal, and reproduce information carried by the corresponding electrical signal; and
    a head-up display configured to present the information,
  wherein the information is carried by the electrical signal, and thereby also carried by the optical beam from the base station to th XRID, and
  wherein the base station is configured to track a location and orientation of the XRID, and generate or modify the information carried by the optical beam based on the location and the orientation of the XRID.

7. The optical communication system of claim 6, wherein the optical communication system comprises a plurality of XRIDs including the XRID, and the optical receiver assembly is configured to detect the optical beam on a communication channel having a particular wavelength assigned to the XRID in the optical communication system, the particular wavelength differing from other particular wavelengths assigned to others of the plurality of XRIDs.

8. The optical communication system of claim 6, wherein the optical communication system comprises a plurality of XRIDs including the XRID, and the optical beam is time-division multiplexed to serve the plurality of XRIDs.

9. The optical communication system of claim 6, wherein the optical communication system comprises a plurality of base stations including the base station, and a plurality of XRIDs including the XRID, the plurality of base stations assigned to respective ones of the plurality of XRIDs,
  wherein the optical receiver assembly is configured to detect the optical beam on a communication channel between the XRID and the base station that is assigned to the XRID.

10. The optical communication system of claim 6, wherein the base station includes a pointing system configured to point the optical transmitter assembly in a direction of the XRID.

11. The optical communication system of claim 6, wherein the base station further includes a tracking system configured to track the XRID as the XRID moves, the pointing system configured to point the optical transmitter assembly in the direction of the XRID as tracked.

12. The optical communication system of claim 6, wherein the XRID includes a pointing system configured to point the optical receiver assembly in a direction of the base station.

13. The optical communication system of claim 6, wherein the XRID further includes a tracking system configured to track the base station as the XRID moves, the pointing system configured to point the optical receiver assembly in the direction of the base station as tracked.

14. An extended reality immersion device (XRID comprising:
  an optical transmitter assembly configured to convert an electrical signal to a corresponding optical beam, and emit the corresponding optical beam in free space, uncollimated and with a divergence angle greater than 0.1 degrees, the optical transmitter assembly including a laser and a longpass filter, the laser configured to emit the corresponding optical beam, and the longpass filter configured to suppress at least some visible and ultraviolet light from the corresponding optical beam;
  an optical receiver assembly having an acceptance angle greater than 0.1 degrees, the optical receiver configured to detect an optical beam in free space, convert the optical beam to a corresponding electrical signal, and reproduce information carried by the corresponding electrical signal; and
  a head-up display configured to present the information,
  wherein the optical receiver assembly and the optical transmitter assembly are combined in an arrangement further including a dichroic configured to pass the corresponding optical beam from which the longpass filter is configured to suppress at least some of the visible and ultraviolet light, and
  wherein the optical receiver assembly includes an optical detector, the longpass filter configured to suppress at least some visible and ultraviolet light from the optical beam, the dichroic configured to reflect the optical beam as filtered to the optical detector, and the optical detector configured to detect the optical beam reflected by the dichroic.

15. The XRID of claim 14, wherein the optical receiver assembly includes at least one array of optical detectors arranged to provide up to 2 pi steradians of coverage.

16. The XRID of claim 14, wherein the optical receiver assembly includes at least one array of coplanar optical detectors.

17. The XRID of claim 14, wherein the optical receiver assembly includes a longpass filter and an optical detector, the longpass filter configured to suppress at least some visible and ultraviolet light from the optical beam, and the optical detector configured to detect the optical beam as filtered.

18. The XRID of claim 17, wherein the optical receiver assembly further includes a bandpass filter between the longpass filter and the optical detector, the bandpass filter configured to further filter the optical beam.

19. The XRID of claim 14, wherein the optical transmitter assembly includes at least one array of lasers arranged to provide at least 2 pi steradians of coverage.

20. The XRID of claim 14, wherein the optical transmitter assembly includes at least one array of coplanar lasers.

21. The XRID of claim 14, wherein the optical transmitter assembly includes a plurality of modulators configured to modulate the electrical signal with information thereby carried by the electrical signal, the plurality of modulators configured to share a total current.

22. The XRID of claim 14, wherein the optical transmitter assembly includes a diffuser configured to diffuse the corresponding optical beam.

23. The XRID of claim 14, wherein the optical receiver assembly is configured to detect the optical beam on a downlink communication channel having a particular wavelength, and the optical transmitter assembly is configured to emit the corresponding optical beam on an uplink communication channel having another, different particular wavelength.

24. The XRID of claim 14, wherein the corresponding electrical signal is encoded with the information using pulse amplitude modulation (PAM) or pulse position modulation (PPM), and the optical receiver assembly is configured to reproduce the information using the PAM or PPM.

25. The XRID of claim 14, wherein the optical receiver assembly is configured to detect the optical beam on a downlink communication channel having a particular wavelength, and
    wherein the XRID further comprises a radio transmitter assembly configured to convert an electrical signal to a corresponding radio signal, and transmit the corresponding radio signal on an uplink communication channel.

\* \* \* \* \*